US012262167B2

(12) United States Patent
Zhang et al.

(10) Patent No.: US 12,262,167 B2
(45) Date of Patent: Mar. 25, 2025

(54) OPEN ACOUSTIC DEVICE

(71) Applicant: SHENZHEN SHOKZ CO., LTD., Guangdong (CN)

(72) Inventors: Chengqian Zhang, Shenzhen (CN); Jinbo Zheng, Shenzhen (CN); Le Xiao, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/318,673

(22) Filed: May 16, 2023

(65) Prior Publication Data

US 2023/0292036 A1 Sep. 14, 2023

Related U.S. Application Data

(63) Continuation of application No. 18/049,620, filed on Oct. 25, 2022, now Pat. No. 11,689,845, which is a (Continued)

(30) Foreign Application Priority Data

Nov. 19, 2021 (CN) ......................... 202111399590.6

(51) Int. Cl.
*H04R 1/10* (2006.01)
*G10K 11/178* (2006.01)

(52) U.S. Cl.
CPC ..... *H04R 1/1083* (2013.01); *G10K 11/17857* (2018.01); *G10K 2210/1081* (2013.01); *H04R 2460/01* (2013.01)

(58) Field of Classification Search
CPC .. H04R 1/1083; H04R 2460/01; H04R 1/406; H04R 3/005; H04R 2201/401;

(Continued)

(56) References Cited

U.S. PATENT DOCUMENTS 8,611,552 B1 12/2013 Murgia et al.
9,824,678 B1 11/2017 Ou (Continued)

FOREIGN PATENT DOCUMENTS

CA 3069085 A1 9/2020
CN 108900943 A 11/2018

(Continued)

OTHER PUBLICATIONS

International Search Report in PCT/CN2022/078037 mailed on Aug. 18, 2022, 10 pages.

(Continued)

*Primary Examiner* — Carolyn R Edwards
*Assistant Examiner* — Friedrich Fahnert
(74) *Attorney, Agent, or Firm* — METIS IP LLC

(57) ABSTRACT

An open acoustic device (100) may include a fixing structure (120) configured to fix the acoustic device (100) near an ear of a user without blocking an ear canal of the user; a first microphone array (130) configured to acquire environmental noise (410); a signal processor (140) configured to: determine, based on the environmental noise, a primary route transfer function (420) between the first microphone array (130) and the ear canal of the user; estimate, based on the environmental noise and the primary route transfer function, a noise signal (430) at the ear canal of the user; and generate, based on the noise signal at the ear canal of the user, a noise reduction signal (440); and a speaker (150) configured to output, according to the noise reduction signal, a noise reduction acoustic wave (450), the noise reduction acoustic wave being configured to eliminate the noise signal.

16 Claims, 14 Drawing Sheets

Related U.S. Application Data continuation of application No. PCT/CN2022/078037, filed on Feb. 25, 2022.

(58) Field of Classification Search

CPC ............... H04R 2460/13; H04R 1/105; H04R 2430/23; G10K 11/17857; G10K 2210/1081; G10K 2210/103; G10K 2210/30231; G10K 2210/30232; G10K 11/17815; G10K 11/17879; G06N 3/0464; G06N 20/00; G10L 21/0216; G10L 25/18

USPC ........................................................ 381/71.1

See application file for complete search history.

(56) References Cited

U.S. PATENT DOCUMENTS

| | | | | |
|---|---|---|---|---|
| 10,970,575 | B2 | 4/2021 | Harvey et al. | |
| 11,328,702 | B1 * | 5/2022 | Xiao | H04R 1/406 |
| 2003/0103635 | A1 | 6/2003 | Wright et al. | |
| 2008/0130929 | A1 | 6/2008 | Arndt et al. | |
| 2009/0304203 | A1 | 12/2009 | Haykin et al. | |
| 2012/0215519 | A1 * | 8/2012 | Park | H04R 3/005 381/17 |
| 2013/0243214 | A1 * | 9/2013 | Penketh | G10K 11/17885 381/71.1 |
| 2014/0105413 | A1 | 4/2014 | Clemow | |
| 2014/0126735 | A1 | 5/2014 | Gauger, Jr. | |
| 2014/0141724 | A1 | 5/2014 | Liu et al. | |
| 2014/0172421 | A1 | 6/2014 | Liu et al. | |
| 2015/0003624 | A1 * | 1/2015 | Sato | G10K 11/17854 381/71.6 |
| 2019/0028803 | A1 | 1/2019 | Benattar | |
| 2020/0163038 | A1 | 5/2020 | Li | |
| 2021/0029443 | A1 | 1/2021 | Liu | |
| 2021/0034725 | A1 * | 2/2021 | Donley | H04R 1/406 |
| 2021/0044882 | A1 * | 2/2021 | Jain | G10K 11/178 |
| 2021/0160602 | A1 * | 5/2021 | Zhang | G06F 3/165 |
| 2021/0168485 | A1 | 6/2021 | Zhang et al. | |
| 2021/0274293 | A1 | 9/2021 | Perkins et al. | |
| 2022/0014850 | A1 | 1/2022 | Alcock | |
| 2022/0201388 | A1 * | 6/2022 | Zhao | G02C 11/06 |
| 2022/0392427 | A1 * | 12/2022 | Mccutcheon | H04R 1/1083 |

FOREIGN PATENT DOCUMENTS

| | | | |
|---|---|---|---|
| CN | 111933102 | A | 11/2020 |
| CN | 112055278 | A | 12/2020 |
| CN | 113241053 | A | 8/2021 |
| CN | 113301461 | A | 8/2021 |
| CN | 113409755 | A | 9/2021 |
| CN | 113421540 | A | 9/2021 |
| EP | 3716652 | A1 | 9/2020 |
| JP | 2012247738 | A | 12/2012 |
| TW | 201212659 | A | 3/2012 |
| WO | 2020052759 | A1 | 3/2020 |

OTHER PUBLICATIONS

Written Opinion in PCT/CN2022/078037 mailed on Aug. 18, 2022, 10 pages.

Decision of Grant in Russian Application No. 2022128729 mailed on Jun. 5, 2023, 24 pages.

The Extended European Search Report in European Application No. 22793098.9 mailed on Nov. 13, 2023, 13 pages.

* cited by examiner

OPEN ACOUSTIC DEVICE

CROSS-REFERENCE TO RELATED APPLICATIONS

This application is a continuation of U.S. patent application Ser. No. 18/049,620, filed on Oct. 25, 2022, which is a continuation of International Patent Application No. PCT/CN2022/078037, filed on Feb. 25, 2022, which claims priority to Chinese Patent Application No. 202111399590.6, filed on Nov. 19, 2021, the entire contents of each of which are hereby incorporated by reference.

TECHNICAL FIELD

The present disclosure relates the acoustic field, and in particular, to an open acoustic device.

BACKGROUND

An acoustic device allows a user to listen to audio content and makes a voice call while ensuring privacy of user interaction content without disturbing surrounding people. The acoustic device is usually divided into two types such as an in-ear acoustic device and an open acoustic device. The in-ear acoustic device may have a structure located in an ear canal of a user during use, which may block an ear of the user, and the user may feel uncomfortable when wearing the in-ear acoustic device for a long time. The open acoustic device may solve the above problems. The open acoustic device may not block the ear of the user, which may be good for long-time wearing. However, a microphone configured to acquire external environmental noise and a speaker that emits a noise reduction acoustic wave in the open acoustic output device may be located near the ear of the user (e.g., a facial area on a front side of an auricle) with a certain distance from the ear canal of the user, and the environmental noise acquired by the microphone may be directly regarded as noise in the ear canal of the user for noise reduction, which may often result in an insignificant noise reduction effect of the open acoustic output device, thereby reducing listening experience of the user.

Therefore, it is desirable to provide an open acoustic device, which can allow the ears of the user being unblocked and has good noise reduction capability, thereby improving listening experience of the user.

SUMMARY

Some embodiments of the present disclosure provide an open acoustic device. The open acoustic device may include: a fixing structure configured to fix the acoustic device near an ear of a user without blocking an ear canal of the user; a first microphone array configured to acquire environmental noise; a signal processor configured to: determine, based on the environmental noise, a primary route transfer function between the first microphone array and the ear canal of the user; estimate, based on the environmental noise and the primary route transfer function, a noise signal at the ear canal of the user; and generate, based on the noise signal at the ear canal of the user, a noise reduction signal; and a speaker configured to output, according to the noise reduction signal, a noise reduction acoustic wave, the noise reduction acoustic wave being configured to eliminate the noise signal at the ear canal of the user.

Some embodiments of the present disclosure provide a method for noise reduction. The method may include: determining, based on environmental noise acquired by a first microphone array, a primary route transfer function between the first microphone array and an ear canal of the user; estimating, based on the environmental noise and the primary route transfer function, a noise signal at the ear canal of the user; and generating, based on the noise signal at the ear canal of the user, a noise reduction signal; and outputting, according to the noise reduction signal, a noise reduction acoustic wave, the noise reduction acoustic wave being configured to eliminate the noise signal at the ear canal of the user.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein.

DETAILED DESCRIPTION

Figure 1:
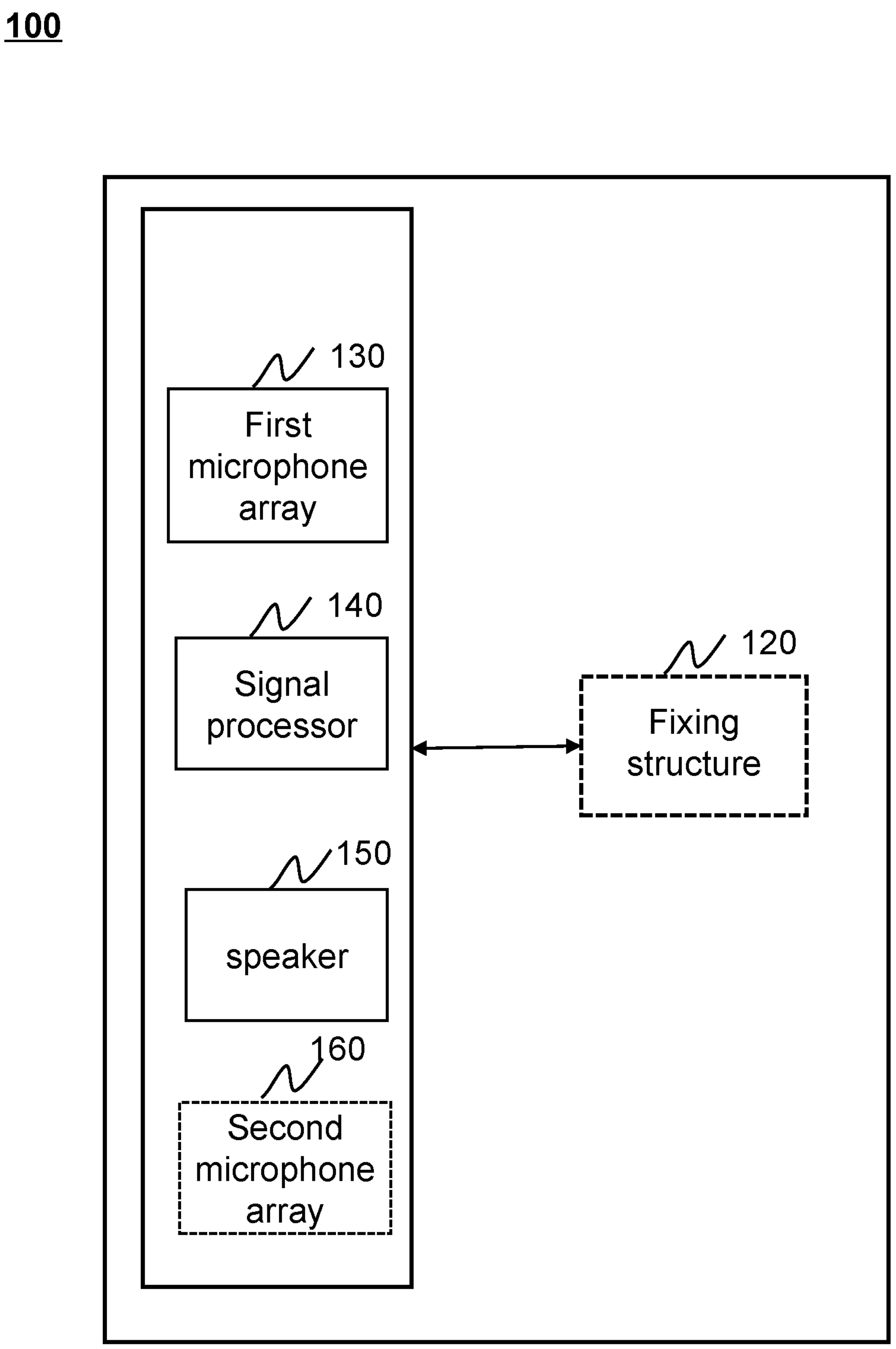
FIG. 1 is a block structural diagram illustrating an exemplary open acoustic device according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

An open acoustic device may include an acoustic device such as an open earphone, etc. The open acoustic device may fix a speaker to an ear attachment of a user through a fixing structure (e.g., an ear hook, a head hook, an earpiece, etc.) without blocking an ear canal of a user. When the user uses an open acoustic device, external environmental noise may also be heard by the user, which may make listening experience of the user relatively poor. For example, in a place where the external environment is noisy (e.g., a street, a scenic spot, etc.), when the user uses the open acoustic device to play music, the external environmental noise may directly enter the ear canal of the user, causing the user to hear relatively loud environmental noise, which may interfere with music listening experience of the user. As another example, when the user wears the open acoustic device for a call, a microphone may not only acquire own voice of the user, but also may acquire the environmental noise, making call experience of the user relatively poor.

Based on the above problems, an open acoustic device is described in the embodiments of the present disclosure. In some embodiments, the acoustic device may include the fixing structure, a first microphone array, a signal processor, and a speaker. The fixing structure may be configured to fix the acoustic device near an ear of a user without blocking the ear canal of the user. The first microphone array may be configured to acquire environmental noise. In some embodiments, the signal processor may be configured to determine, based on the environmental noise, a primary route transfer function between the first microphone array and the ear canal of the user. The primary route transfer function may refer to a phase-frequency response of the environmental noise at the first microphone array transferred to the ear canal of the user. Further, the signal processor may estimate, based on the environmental noise and the primary route transfer function, a noise signal at the ear canal of the user; and generate, based on the noise signal at the ear canal of the user, a noise reduction signal. In some embodiments, the speaker may be configured to output, according to the noise reduction signal, a noise reduction acoustic wave. The noise reduction acoustic wave may be configured to eliminate the noise signal at the ear canal of the user. In the open acoustic device provided by the embodiments of the present disclosure, the first microphone array may include a plurality of microphones. The signal processor may determine a direction of a noise source through the environmental noise acquired by the plurality of microphones. The signal processor may determine the primary route transfer function according to parameter information (e.g., a frequency) of the environmental noise, the direction of the noise source, and position information of the microphones in the first microphone array and the ear canal of the user. The signal processor may estimate the noise signal at the ear canal of the user based on the parameter information (phase information, frequency information, amplitude information, etc.) of the environmental noise and the primary route transfer function. Further, the signal processor may generate a noise reduction signal based on the estimated noise signal at the ear canal of the user, and the speaker may generate a noise reduction acoustic wave based on the noise reduction signal to eliminate the noise at the ear canal of the user. The open acoustic device provided by the embodiments of the present disclosure may perform noise reduction for noise in different frequency ranges, and present a specific noise reduction effect. For example, in a frequency range of 150 Hz-2000 Hz, a noise reduction depth of the open acoustic device may be 5 dB-25 dB, which may significantly improve the noise reduction effect of the open acoustic device in the frequency range.

FIG. 1 is a block structural diagram illustrating an exemplary open acoustic device 100 according to some embodiments of the present disclosure. As shown in FIG. 1, the open acoustic device 100 may include a fixing structure 120, a first microphone array 130, a signal processor 140, and a speaker 150. In some embodiments, the open acoustic device 100 may fix the open acoustic device 100 near an ear of a user through the fixing structure 120 without blocking an ear canal of the user. The first microphone array 130 may be configured to acquire environmental noise. The signal processor 140 may be coupled (e.g., electrically connected) with the first microphone array 130, and the speaker 150. The signal processor 140 may receive a signal of the first microphone array 130, and the signal processor 140 may also send the signal to the speaker 150. For example, the signal processor 140 may receive and process an environmental noise-converted electrical signal transmitted by the first microphone array 130 to obtain parameter information (e.g., amplitude information, phase information, etc.) of the environmental noise. In some embodiments, the first microphone array 130 may include a plurality of microphones. The signal processor 140 may determine a position of a noise source based on the environmental noise acquired by the plurality of microphones. In some embodiments, the signal processor 140 may determine a primary route transfer function between the first microphone array 130 and the ear canal of the user based on the parameter information (e.g., the frequency) of the environmental noise, the position of the noise source, and position information of the first microphone array 130 and the ear canal of the user. The signal processor 140 may also estimate, based on the environmental noise and the primary route transfer function, a noise signal at the ear canal of the user. Parameter information of a noise reduction signal may correspond to the parameter information of the environmental noise. For example, an amplitude of the noise reduction signal may be similar to the amplitude of the environmental noise. A phase of the noise reduction signal may be approximately opposite to the phase of the environmental noise. The signal processor 140 may transmit the generated noise reduction signal to the speaker 150. The speaker 150 may output a noise reduction acoustic wave according to the noise reduction signal. The noise reduction acoustic wave may cancel each other out with the environmental noise at the ear canal of the user, so as to realize active noise reduction of the open acoustic device 100 and improve listening experience of the user in a process of using the open acoustic device 100.

The first microphone array 130 may be configured to acquire the environmental noise. In some embodiments, the environmental noise may refer to a combination of a plurality of external sounds in an environment where the user is located. In some embodiments, the environmental noise may include a traffic noise, an industrial noise, a building construction noise, a social noise, or the like, or any combination thereof. In some embodiments, the traffic noise may include, but is not limited to, a driving noise, a whistle noise, etc. of a motor vehicle. The industrial noise may include, but is not limited to, a factory power machinery operating noise, etc. The building construction noise may include, but is not limited to, a power machinery excavation noise, a hole drilling noise, a stirring noise, etc. The social living environment noise may include, but is not limited to, a crowd assembly noise, an entertainment and publicity noise, a crowd noise, a household appliance noise, etc. In some embodiments, the first microphone array 130 may be disposed near the ear canal of the user for acquiring the environmental noise transmitted to the ear canal of the user. The first microphone array 130 may convert an acquired environmental noise signal into an electrical signal and transmit the electrical signal to the signal processor 140 for signal processing. In some embodiments, the environmental noise may also include speech of the user. For example, when the open earphone 100 is a non-calling state, a sound generated by the speech of the user may also be regarded as the environmental noise. The first microphone array 130 may acquire the sound generated by the speech of the user and other environmental noise, and convert the sound signal generated by the speech of the user and other environmental noise into the electrical signal and transmit the electrical signal to the signal processor 140 for signal processing. In some embodiments, the first microphone array 130 may be distributed on the left ear or the right ear of the user. In some embodiments, the first microphone array 130 can also be located at the left ear and the right ear of the user. For example, the first microphone array 130 may include a first sub-microphone array and a second sub-microphone array. The first sub-microphone array may be located at the left ear of the user. The second sub-microphone array may be located at the right ear of the user. The first sub-microphone array and the second sub-microphone array may enter a working state at the same time or one of the first sub-microphone array and the second sub-microphone array may enter the working state.

In some embodiments, the environmental noise may include the speech of the user. For example, the first microphone array 130 can acquire the environmental noise according to a calling state of the open acoustic device 100. When the open acoustic device 100 is in a non-calling state, the sound generated by the speech of the user may also be regarded as the environmental noise. The first microphone array 130 may acquire the sound generated by the speech of the user and other environmental noise. When the open acoustic device 100 is in a calling state, the sound generated by the speech of the user may not be regarded as the environmental noise. The first microphone array 130 may acquire the environmental noise other than the sound generated by the speech of the user. For example, the first microphone array 130 may acquire the noise emitted by a noise source located at a distance (e.g., 0.5 m, 1 m) away from the first microphone array 130.

In some embodiments, the first microphone array 130 may include two or more microphones. The first microphone array 130 may include an air conduction microphone and/or a bone conduction microphone. In some embodiments, the first microphone array 130 may include two or more air conduction microphones. For example, when the user listens to music using the open acoustic device 100, the air conduction microphone may simultaneously obtain the external environment noise and the sound generated by the speech of the user, convert the obtained external environmental noise and the sound generated by the speech of the user into an electrical signal as the environmental noise, and transmit the electrical signal to the signal processor 140 for processing. In some embodiments, the first microphone array 130 may also include two or more bone conduction microphones. In some embodiments, the bone conduction microphone may be in direct contact with a head skin of the user. When the user speaks, a vibration signal generated by facial bones or muscles may be directly transmitted to the bone conduction microphone, and the bone conduction microphone may convert the vibration signal into an electrical signal and transmit the electrical signal to the signal processor 140 for signal processing. In some embodiments, the bone conduction microphone may also not be in direct contact with the human body. When the user speaks, the vibration signal generated by facial bones or muscles may be transmitted to a housing structure first, and then transmitted from the housing structure to the bone conduction microphone. The bone conduction microphone may further convert the vibration signal of the human body into an electrical signal containing voice information. For example, when the user is in the calling state, the signal processor 140 may perform the noise reduction processing on the sound signal acquired by the air conduction microphone as the environmental noise, and retain the sound signal acquired by the bone conduction microphone as the voice signal, thereby ensuring speech quality of the user during the call.

In some embodiments, according to a working principle of the microphone, the first microphone array 130 may include a moving-coil microphone, a ribbon microphone, a condenser microphone, an electret microphone, an electromagnetic microphone, a carbon particle microphone, or the like, or any combination thereof. In some embodiments, an arrangement of the first microphone array 130 may include a linear array (e.g., a straight line, a curve), a planar array (e.g., a regular and/or irregular shape such as a cross, a circle, a ring, a polygon, a mesh, etc.), a three-dimensional array (e.g., a cylinder, a sphere, a hemisphere, a polyhedron, etc.), or the like, or any combination thereof. Detailed descriptions regarding the arrangement of the first microphone array 130 may be found in FIGS. 13A-13D, FIG. 14A, FIG. 14B and relevant descriptions thereof.

The signal processor 140 may be configured to determine, based on the environmental noise, the primary route transfer function between the first microphone array 130 and the ear canal of the user; estimate, based on the environmental noise and the primary route transfer function, the noise signal at the ear canal of the user; and generate, based on the noise signal at the ear canal of the user, the noise reduction signal. The primary route transfer function may refer to a transfer route function from the first microphone array 130 to the ear canal of the user. In some embodiments, the signal processor 140 may estimate a direction of a noise source based on the environmental noise, and determine the primary route transfer function according to the parameter information (e.g., a frequency) of the environmental noise, the direction of the noise source, and the position information of the first microphone array 130 and the ear canal of the user. In some embodiments, the signal processor 140 may estimate the noise signal at the ear canal of the user based on the parameter information (e.g., the phase information, the frequency information, the amplitude information, etc.) of the environmental noise and the primary route transfer function. Further, the signal processor 140 may generate the noise reduction signal based on the estimated noise signal at the ear canal of the user.

In some embodiments, the open acoustic device 100 may also include a second microphone array. The signal processor 140 may estimate, based on the environmental noise acquired by the second microphone array and the noise reduction acoustic wave, the noise at the ear canal. Further, the signal processor 140 may update, based on the sound signal at the ear canal, the noise reduction signal. In some embodiments, the signal processor 140 may also obtain, based on the sound signal acquired by the second microphone array, the noise reduction acoustic wave acquired by the second microphone array. The signal processor 140 may determine, based on the noise reduction acoustic wave output by the speaker 150 and the noise reduction acoustic wave acquired by the second microphone array, the first secondary route transfer function (The first secondary route may be a transmission route of the sound signal from the speaker 150 to the second microphone array). The signal processor 140 may determine, based on the first secondary route transfer function through a machine learning model or a preset model that has been trained, the second secondary route transfer function (The second secondary route may be a transmission route of the sound signal from the second microphone array to the ear canal). The signal processor 140 may determine, based on the first secondary route transfer function and the second secondary route transfer function, an overall secondary route transfer function (the overall secondary route may be a transmission route of the sound signal from the speaker 150 to the ear canal). The signal processor 140 may estimate, based on the noise signal at the ear canal of the user, the noise reduction acoustic wave at the ear canal of the user and generate, based on the noise reduction acoustic wave at the ear canal of the user and the overall secondary route transfer function, the noise reduction signal.

In some embodiments, the signal processor 140 may include a hardware module and a software module. Merely by way of example, the hardware module may include a digital signal processor (DSP) and an advanced RISC machine (ARM). The software module may include an algorithm module. More descriptions regarding the signal processor 140 may be found in FIG. 3 and relevant descriptions thereof.

The speaker 150 may be configured to output, according to the noise reduction signal, the noise reduction acoustic wave. The noise reduction acoustic wave may be configured to reduce or eliminate the environmental noise transmitted to the ear canal of the user (e.g., a tympanic membrane, a basilar membrane). Merely by way of example, the signal processor 140 may control the speaker 150 to output the noise reduction acoustic wave with an similar amplitude and an opposite phase to the noise signal at the ear canal of the user to cancel the noise signal at the ear canal of the user. In some embodiments, when the user wears the open acoustic device 100, the speaker 150 may be located near the ear the user. In some embodiments, according to a working principle of a speaker, the speaker 150 may include an electrodynamic speaker (e.g., a moving-coil speaker), a magnetic speaker, an ion speaker, an electrostatic speaker (or a condenser speaker), a piezoelectric speaker, or the like, or any combination thereof. In some embodiments, according to a transmission mode of sound output by the speaker, the speaker 150 may include an air conduction speaker and/or a bone conduction speaker. In some embodiments, a count of the speakers 150 may be one or more. When the count of the speakers 150 is one, the speaker 150 may be configured to output the noise reduction acoustic wave to eliminate the environmental noise and deliver sound information that the user needs to hear (e.g., an audio from a media device, an audio of a remote device for calling) to the user. For example, when the count of the speakers 150 is one and the speaker is the air conduction speaker, the air conduction speaker may be configured to output the noise reduction acoustic wave to eliminate the environmental noise. In this case, the noise reduction acoustic wave may be an acoustic wave signal (i.e., air vibration). The acoustic wave signal may be transmitted through the air to a target spatial position (e.g., the ear canal of the user), and the acoustic wave signal and the environmental noise may cancel each other out. At the same time, the air conduction speaker may also be configured to transmit the sound information that the user needs to hear to the user. As another example, when the count of the speakers 150 is one and the speaker is a bone conduction speaker, the bone conduction speaker may be configured to output the noise reduction acoustic wave to eliminate the environmental noise. In this case, the noise reduction acoustic wave may be a vibration signal (e.g., vibration of a speaker housing). The vibration signal may be transmitted to the basilar membrane of the user through bones or tissues, and the noise reduction acoustic wave and the environmental noise may cancel each other out at the basilar membrane of the user. At the same time, the bone conduction speaker may also be configured to transmit the sound information that the user needs to hear to the user. When the count of the speakers 150 is more than one, a portion of the plurality of the speakers 150 may be configured to output the noise reduction acoustic wave to eliminate the environmental noise, and the other portion of the plurality of speakers 150 may be configured to transmit the sound information (e.g., an audio from a media device, an audio of a remote device for calling) that the user needs to hear to the user. For example, when the count of the speakers 150 is more than one and the plurality of speakers include a bone conduction speaker and an conduction speaker, the air conduction speaker may be configured to output the noise reduction acoustic wave to reduce or eliminate the environmental noise. Compared with the air conduction speaker, the bone conduction speaker may transmit mechanical vibration directly to the auditory nerve of the use through the body (such as bones, skin tissue, etc.) of the user. In this process, the bone conduction speaker may have relatively little interference to the air conduction microphone that acquires the environmental noise.

It should be noted that the speaker 150 may be an independent functional device, or may be a part of a single device capable of implementing a plurality of functions. Merely by way of example, the speaker 150 may be integrated and/or formed in one piece with the signal processor 140. In some embodiments, when the count of the speakers 150 is more than one, an arrangement of the plurality of speakers 150 may include a linear array (e.g., a straight line, a curve), a planar array (e.g., a regular and/or irregular shape such as a cross, a mesh, a circle, a ring, a polygon, etc.), a three-dimensional array (e.g., a cylinder, a sphere, a hemisphere, a polyhedron, etc.), or the like, or any combination thereof, which is not limited herein. In some embodiments, the speaker 150 may be disposed in the left ear and/or the right ear of the user. For example, the speaker 150 may include a first sub-speaker and a second sub-speaker. The first sub-speaker may be located at the left ear of the user. The second sub-speaker may be located at the right ear of the user. The first sub-speaker and the second sub-speaker may enter the working state at the same time or one of the first sub-speaker and the second sub-speaker may enter the working state. In some embodiments, the speaker 150 may be a speaker with a directional sound field, a main lobe of which may be directed to the ear canal of the user.

In some embodiments, in order to ensure consistency of signal acquiring, all microphones in the first microphone array 130 may be located at positions that are not or less affected by the speaker 150 in the open acoustic device 100. In some embodiments, the speaker 150 may form at least one set of acoustic dipole. For example, a front of a diaphragm and a back of a diaphragm of the speaker 150 may be regarded as two sound sources, and may output a set of sound signals with approximately opposite phases and similar amplitudes. The two acoustic sources may form an acoustic dipole or may be similar to an acoustic dipole, and the sound radiated outward may have obvious directivity. Ideally, in a direction of a straight line connecting two point sound sources, the sound radiated by the speaker may be relatively loud, and the sound radiated in other directions may be significantly reduced. The sound radiated by the speaker 150 at a region of a mid-perpendicular line (or near the mid-perpendicular line) of the connecting line between the two point sound sources may be the lightest. Therefore, all the microphones in the first microphone array 130 may be placed in a region where a sound pressure level of the speaker 150 is minimum, i.e., the region of the mid-perpendicular line (or near the mid-perpendicular line) of the connecting line between the two point sound sources.

In some embodiments, the open acoustic device 100 may include the second microphone array 160. In some embodiments, the second microphone array 160 may have two or more microphones. The microphones may include a bone conduction microphone and an air conduction microphone. In some embodiments, the second microphone array 160 may be at least partially different from the first microphone array 130. For example, the microphones in the second microphone array 160 may be different from the microphones in the first microphone array 130 in a count, a type, a position, an arrangement, or the like, or any combination thereof. For example, in some embodiments, the arrangement of the microphones in the first microphone array 130 may be linear, and the arrangement of the microphones in the second microphone array 160 may be circular. As another example, the microphones in the second microphone array 160 may only include an air conduction microphone. The first microphone array 130 may include an air conduction microphone and a bone conduction microphone. In some embodiments, the microphones in the second microphone array 160 may be any one or more microphones included in the first microphone array 130. The microphones in the second microphone array 160 may also be independent of the microphones in the first microphone array 130. The second microphone array 160 may be configured to acquire the environmental noise and the noise reduction acoustic wave. The environmental noise and the noise reduction acoustic wave acquired by the second microphone array 160 may be transmitted to the signal processor 140. In some embodiments, the signal processor 140 may update, based on the sound signal acquired by the second microphone array 160, the noise reduction signal. In some embodiments, the signal processor 140 may determine, based on the sound signal acquired by the second microphone array 160, the overall secondary route transfer function between the speaker 150 and the ear canal of the user, and estimate, according to the noise signal at the ear canal of the user and the overall secondary route transfer function, the noise reduction signal. Specific descriptions regarding updating, based on the sound signal acquired by the second microphone array 160, the noise reduction signal may be found in FIGS. 8-12 of the present disclosure and relevant descriptions thereof.

In some embodiments, the open acoustic device 100 may include a fixing structure 120. The fixing structure 120 may be configured to fix the acoustic device 100 near the ear of the user without blocking the ear canal of the user. In some embodiments, the fixing structure 120 may be physically connected (e.g., a snap connection, a screw connection, etc.) with the housing structure of the open acoustic device 100. In some embodiments, the housing structure of the open acoustic device 100 may be a part of the fixing structure 120. In some embodiments, the fixing structure 120 may include an ear hook, a back hook, an elastic band, an earpiece, etc., so that the open acoustic device 100 may be better fixed near the ear of the user and prevent the open acoustic device 100 from falling during use. For example, the fixing structure 120 may be the ear hook, and the ear hook may be configured to be worn around the ear. In some embodiments, the ear hook may be a continuous hook, and may be elastically stretched to be worn on the ear of the user. At the same time, the ear hook may also exert pressure on the auricle of the user, so that the open acoustic device 100 may be firmly fixed to a certain position of the ear or the head of the user. In some embodiments, the ear hook may be a discontinuous band. For example, the ear hook may include a rigid portion and a flexible portion. The rigid portion may be made of rigid material (e.g., a plastic, a metal, etc.), and the rigid portion may be fixed to the housing structure of the acoustic output device 100 via a physical connection (e.g., a snap connection, a screw connection, etc.). The flexible portion may be made of an elastic material (e.g., a cloth, a composite material, a neoprene, etc.). As another example, the fixing structure may include a neckband which may be worn around the neck/shoulder of the user. As yet another example, the fixing structure 120 may be the earpiece, which may be a part of a pair of glasses and may be erected on the ear of the user.

In some embodiments, the open acoustic device 100 can include the housing structure. The housing structure may be configured to carry other components of the open acoustic device 100 (e.g., the first microphone array 130, the signal processor 140, the speaker 150, the second microphone array 160, etc.). In some embodiments, the housing structure may be an enclosed or semi-enclosed structure with an internal hollow, and other components of the open acoustic device 100 may be disposed in or on the housing structure. In some embodiments, a shape of the housing structure may be a regular or irregular three-dimensional structure such as a cuboid, a cylinder, a truncated cone, etc. When the user wears the open acoustic device 100, the housing structure may be located near the ear of the user. For example, the housing structure may be located on a peripheral side (e.g., the front side or a rear side) of the auricle of the user. As another example, the housing structure may be located at the ear of the user without blocking or covering the ear canal of the user. In some embodiments, the open acoustic device 100 may be a bone conduction earphone. At least one side of the housing structure may be in contact with the skin of the user. An acoustic driver (e.g., a vibration speaker) in the bone conduction earphone may convert an audio signal into mechanical vibration. The mechanical vibration may be transmitted to the auditory nerve of the user through the housing structure and the bones of the user. In some embodiments, the open acoustic device 100 may be an air conduction earphone. At least one side of the housing structure may or may not be in contact with the skin of the user. A side wall of the housing structure may include at least one sound guiding hole. The speaker in the air conduction earphone may convert the audio signal into air conduction sound. The air conduction sound may be radiated towards the ear of the user through the sound guiding hole.

In some embodiments, the open acoustic device 100 may also include one or more sensors. The one or more sensors may be electrically connected to other components of the open acoustic device 100 (e.g., the signal processor 140). The one or more sensors may be configured to obtain a physical position and/or motion information of the open acoustic device 100. Merely by way of example, the one or more sensors may include an inertial measurement unit (IMU), a global positioning system (GPS), a Radar, etc. The motion information may include a motion trajectory, a motion direction, a motion speed, a motion acceleration, a motion angular velocity, a motion-related time information (e.g., a motion start time, a motion end time), or the like, or any combination thereof. Taking IMU as an example, the IMU may include a micro electro mechanical system (MEMS). The MEMS may include a multi-axis accelerometer, a gyroscope, a magnetometer, or the like, or any combination thereof. The IMU may be configured to detect the physical position and/or the motion information of the open acoustic device 100 to realize the control of the open acoustic device 100 based on the physical position and/or the motion information.

In some embodiments, the open acoustic device 100 may include a signal transceiver. The signal transceiver may be electrically connected to other components of the open acoustic device 100 (e.g., the signal processor 140). In some embodiments, the signal transceiver may include Bluetooth, antenna, etc. The open acoustic device 100 may communicate with other external devices (e.g., a mobile phone, a tablet computer, a smart watch) through the signal transceiver. For example, the open acoustic device 100 may wirelessly communicate with other devices through Bluetooth.

In some embodiments, the open acoustic device 100 may also include an interactive module configured to adjust the sound pressure of the noise reduction acoustic wave. In some embodiments, the interactive module may include a button, a voice assistant, a gesture sensor, etc. The user may adjust the noise reduction mode of the open acoustic device 100 by controlling the interactive module. Specifically, the user may adjust (e.g., enlarge or reduce) the amplitude information of the noise reduction signal by controlling the interactive module, so as to change the sound pressure of the noise reduction acoustic wave emitted by the speaker 150, thereby achieving different noise reduction effects. Merely by way of example, the noise reduction mode may include a strong noise reduction mode, a medium noise reduction mode, a weak noise reduction mode, etc. For example, when the user wears the open acoustic device 100 indoors, the external environmental noise may be light. The user may turn off or adjust the noise reduction mode of the open acoustic device 100 to the weak noise reduction mode through the interactive module. As another example, when the user wears the open acoustic device 100 when walking in a public place such as a street, the user may need to maintain a certain awareness of a surrounding environment while listening to an audio signal (e.g., music, voice information) to cope with an emergency, At this point, the user may choose the medium noise reduction mode through the interactive module (e.g., the button or the voice assistant) to preserve environmental noise (such as a siren, an impact sound, a sound of car horn, etc.). As yet another example, when the user takes a public vehicle such a subway, an airplane, etc., the user may choose the strong noise reduction mode through the interactive module to further reduce the surrounding environmental noise. In some embodiments, the signal processor 140 may also send prompt information to the open acoustic device 100 or a terminal device (e.g., a mobile phone, a smart watch, etc.) that is communicatively connected to the open acoustic device 100 based on an intensity range of the environmental noise, so as to remind the user to adjust the noise reduction mode.

Figure 2:
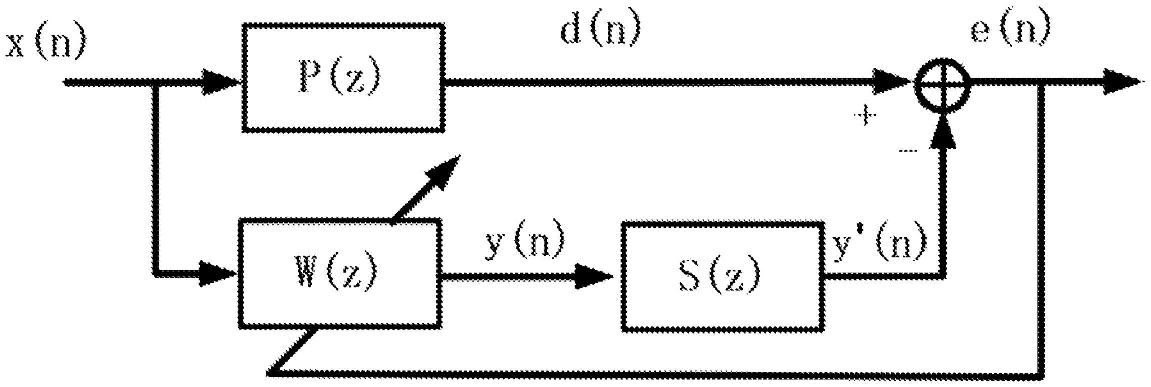
FIG. 2 is a schematic diagram illustrating exemplary noise reduction of an open acoustic device according to some embodiments of the present disclosure.

FIG. 2 is a schematic diagram illustrating exemplary noise reduction of an open acoustic device according to some embodiments of the present disclosure. As shown in FIG. 2, x(n) denotes a primary noise signal (an environmental noise signal) acquired by the first microphone array 130. P(z) denotes a primary route that the primary noise signal spreads from the first microphone array 130 to the ear canal. d(n) denotes a primary noise signal that spreads to the second microphone array 160. W(z) denotes an adaptive filter with active noise reduction. y(n) denotes an output signal of the adaptive filter. S(z) denotes an overall secondary route of a secondary sound source (a noise reduction acoustic wave) spreading from the speaker 150 to the ear canal. Y'(n) denotes sound of the noise reduction acoustic wave reaching the ear canal through the overall secondary route. e(n) denotes the sound at the ear canal of the user. A goal of the noise reduction of the open acoustic device 100 may be to minimize the sound e(n) at the ear canal, for example, e(n)=0. Specific descriptions regarding the first microphone array 130 capturing a signal x(n) may be found in FIG. 5, which is not limited herein. In some embodiments, the open acoustic device 100 (the signal processor 140) may estimate a noise signal at the ear canal of the user according to the primary route P(z) between the first microphone 130 and the ear canal of the user and the primary noise signal acquired by the first microphone 130 to generate a corresponding noise reduction signal. The speaker 150 may generate a noise reduction acoustic wave based on the noise reduction signal. However, due to a certain distance between the speaker 150 and the ear canal of the user, a noise reduction acoustic wave received at the ear canal of the user and the noise reduction acoustic wave from the speaker 150 may be different, which may reduce a noise reduction effect. In some embodiments, the open acoustic device 100 may determine the overall secondary route S(z) between the speaker 150 and the ear canal according to the noise reduction acoustic wave acquired by the second microphone array 160 and the environmental noise, so as to determine the noise reduction signal according to the overall secondary route S(z) to enhance noise reduction capacity of the noise reduction acoustic wave from the speaker 150 received at the ear canal of the user, so that the sound e(n) at the ear canal of the user is reduced to the lightest.

It should be noted that the above description of FIG. 1 and FIG. 2 is merely provided for the purpose of illustration, and is not intended to limit the scope of the present disclosure. For persons having ordinary skills in the art, a plurality of variations and modifications may be made under the teachings of the present disclosure. However, those variations and modifications do not depart from the scope of the present disclosure. For example, one or more components in the open acoustic device 100 (e.g., a fixing structure, etc.) may be omitted. In some embodiments, a component may be replaced by other components that can implement similar functions. For example, in some embodiments, the open acoustic device 100 may not include the fixing structure. A housing structure of the open acoustic device 100 may be a housing structure with a shape matched a shape of the ear of the user. The shape of the housing structure may include a circular ring, an oval, a (regular or irregular) polygonal, a U-shape, a V-shape, a semi-circle, etc., and the housing structure may be directly anchored at the ear of the user. In some embodiments, one component may be split into a plurality of sub-components, or a plurality of components may be merged into a single component.

Figure 3:
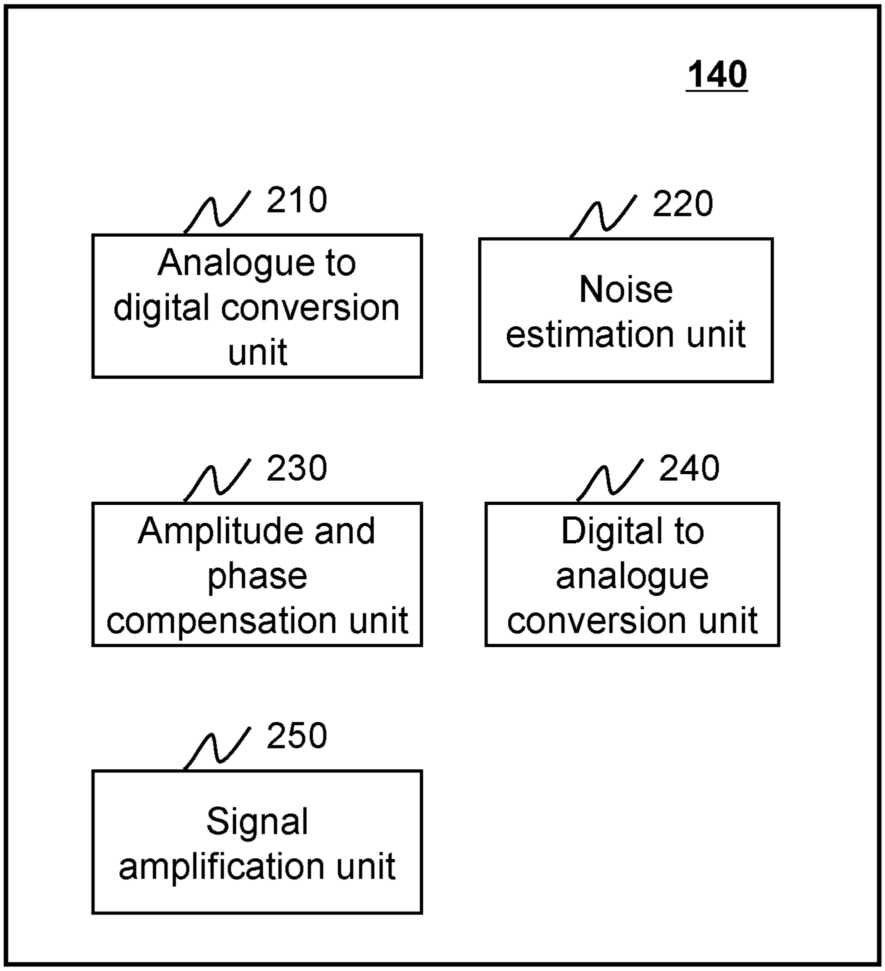
FIG. 3 is a schematic diagram illustrating an exemplary structure of a signal processor according to some embodiments of the present disclosure.

FIG. 3 is a schematic diagram illustrating an exemplary structure of a signal processor according to some embodiments of the present disclosure. As shown in FIG. 3, the signal processor 140 may include an analogue to digital conversion unit 210, a noise estimation unit 220, an amplitude and phase compensation unit 230, and a digital to analogue conversion unit 240.

In some embodiments, the analogue to digital conversion unit 210 may be configured to convert a signal input by the first microphone array 130 or the second microphone array 160 into a digital signal. For example, the first microphone array 130 may acquire environmental noise, convert the acquired environmental noise into an electrical signal, and transmit the electrical signal to the signal processor 140. After receiving the electrical signal of the environmental noise sent by the first microphone array 130, the analogue to digital conversion unit 210 may convert the electrical signal into a digital signal. In some embodiments, the analogue to digital conversion unit 210 may be electrically connected to the first microphone array 130 and further electrically connect to other components of the signal processor 140 (e.g., the noise estimation unit 220). Further, the analogue to digital conversion unit 210 may transmit the converted digital signal of the environmental noise to the noise estimation unit 220.

In some embodiments, the noise estimation unit 220 may be configured to estimate the environmental noise from the received digital signal of the environmental noise. For example, the noise estimation unit 220 may estimate relevant parameter of the environmental noise of a target spatial position (e.g., an ear canal of a user) of the received digital signal of the environmental noise. Merely by way of example, the parameters may include a direction of a noise resource, an amplitude, a phase, etc., at the target spatial position (e.g., the ear canal of the user), or any combination thereof. In some embodiments, the noise estimation unit 220 may estimate the direction of the noise source according to the digital signal of the environmental noise received by the first microphone array 130, determine a primary route transfer function according to the environmental noise(e.g., a frequency), the direction of the noise source, and position information between the first microphone array 130 and the ear canal of the user, and estimate a noise signal at the ear canal of the user based on the environmental noise and the primary route transfer function. In some embodiments, the noise estimation unit 220 may estimate noise at the ear canal of the user according to the environmental noise acquired by the second microphone array 160 and the noise reduction acoustic wave, and update a noise reduction signal based on the sound signal at the ear canal of the user. In some embodiments, the noise estimation unit 220 may determine an overall secondary route transfer function between the speaker 150 and the ear canal of the user based on a sound signal acquired by the second microphone array 160, and update the noise reduction signal according to the noise signal at the ear canal of the user and the overall secondary route transfer function. In some embodiments, the noise estimation unit 220 may also be configured to estimate a sound field at the target spatial position (e.g., the ear canal of the user) using the first microphone array 130. In some embodiments, the noise estimation unit 220 may be electrically connected to other components of the signal processor 140 (e.g., the amplitude and phase compensation unit 230). Further, the noise estimation unit 220 may transmit the estimated parameters related to the environmental noise and the sound field at the target spatial position to the amplitude and phase compensation unit 230.

In some embodiments, the amplitude and phase compensation unit 230 may be configured to compensate the estimated parameters related to the environmental noise according to the sound field at the target spatial position. For example, the amplitude and phase compensation unit 230 may compensate the amplitude and the phase of the environmental noise according to the sound field at the ear canal of the user. The signal processor 140 may generate a digital noise reduction signal based on the environmental noise compensated by the amplitude and phase compensation unit 230. In some embodiments, the amplitude and phase compensation unit 230 may adjust the amplitude of the environmental noise and perform reverse compensation on the phase of the environmental noise. The signal processor 140 may generate a digital noise reduction signal based on the environmental noise compensated by the amplitude and phase compensation unit 230. An amplitude of the digital noise reduction signal may be similar to the amplitude of the digital signal corresponding to the environmental noise. A phase of the digital noise reduction signal may be approximately opposite to the phase of the digital signal corresponding to the environmental noise. In some embodiments, the amplitude and phase compensation unit 230 may be electrically connected to other components of the signal processor 140 (e.g., the digital to analogue conversion unit 240). Further, the amplitude and phase compensation unit 230 may transmit the digital noise reduction signal to the digital to analogue conversion unit 240.

In some embodiments, the digital to analogue conversion unit 240 may be configured to convert the digital noise reduction signal to an analog signal to obtain the noise reduction signal (e.g., the electrical signal). Merely by way of example, the digital to analogue conversion unit 240 may include pulse width modulation (PMW). In some embodiments, the digital analogue to digital conversion unit 240 may be connected to other components of the open acoustic device 100 (e.g., the speaker 150). Further, the digital to analogue conversion unit 240 may transmit the noise reduction signal to the speaker 150.

In some embodiments, the signal processor 140 may include a signal amplification unit 250. The signal amplification unit 250 may be configured to amplify an input signal. For example, the signal amplification unit 250 may amplify the signal input by the first microphone array 130. Merely by way of example, when the open acoustic device 100 is in a calling state, the signal amplification unit 250 may be configured to amplify speech of the user input by the first microphone array 130. In some embodiments, the signal amplification unit 250 may be electrically connected to other components of the open acoustic device 100 or the signal processor 140 (e.g., the first microphone array 130, the noise estimation unit 220, and the amplitude and phase compensation unit 230).

It should be noted that the above description of FIG. 3 is merely provided for the purpose of illustration, and is not intended to limit the scope of the present disclosure. For persons having ordinary skills in the art, a plurality of variations and modifications may be made under the teachings of the present disclosure. In some embodiments, one or more components in the signal processor 140 (e.g., the signal amplification unit 250) may be omitted. In some embodiments, one component in the signal processor 140 may be split into a plurality of sub-components, or a plurality of components may be merged into a single component. For example, the noise estimation unit 220 and the amplitude and phase compensation unit 230 may be set as a component to realize functions of the noise estimation unit 220 and the amplitude and phase compensation unit 230. However, those variations and modifications do not depart from the scope of the present disclosure.

Figure 4:
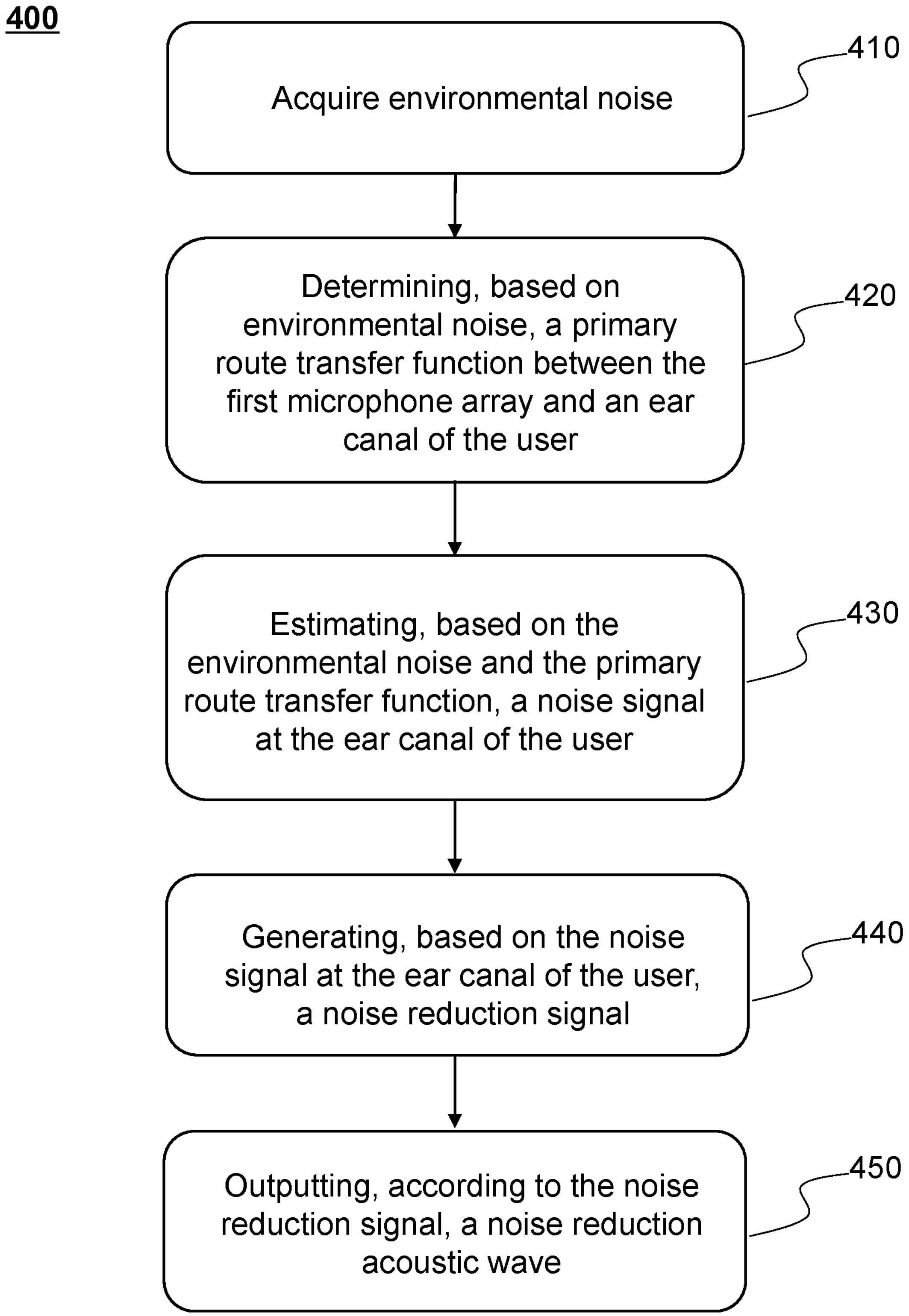
FIG. 4 is a flowchart illustrating an exemplary process for noise reduction according to some embodiments of the present disclosure.

FIG. 4 is a flowchart illustrating an exemplary process for noise reduction according to some embodiments of the present disclosure. As shown in FIG. 4, the process 400 may include the following operations.

In 410, environmental noise may be acquired.

In some embodiments, the operation may be executed by the first microphone array 130.

According to the above descriptions of FIGS. 1-2, the environmental noise may refer to a combination of various external sounds (e.g., a traffic noise, an industrial noise, a building construction noise, a social noise) in an environment where a user is located. In some embodiments, the first microphone array 130 may be located near an ear canal of the user. When the environmental noise is transmitted to the first microphone array 130, each microphone in the first microphone array 130 may convert an environmental noise signal respectively acquire into an electrical signal and transmit the electrical signal to the signal processor 140 for signal processing.

In 420, a primary route transfer function between the first microphone array and the ear canal of the user may be determined based on the environmental noise.

In some embodiments, the operation may be executed by the signal processor 140.

Figure 5:
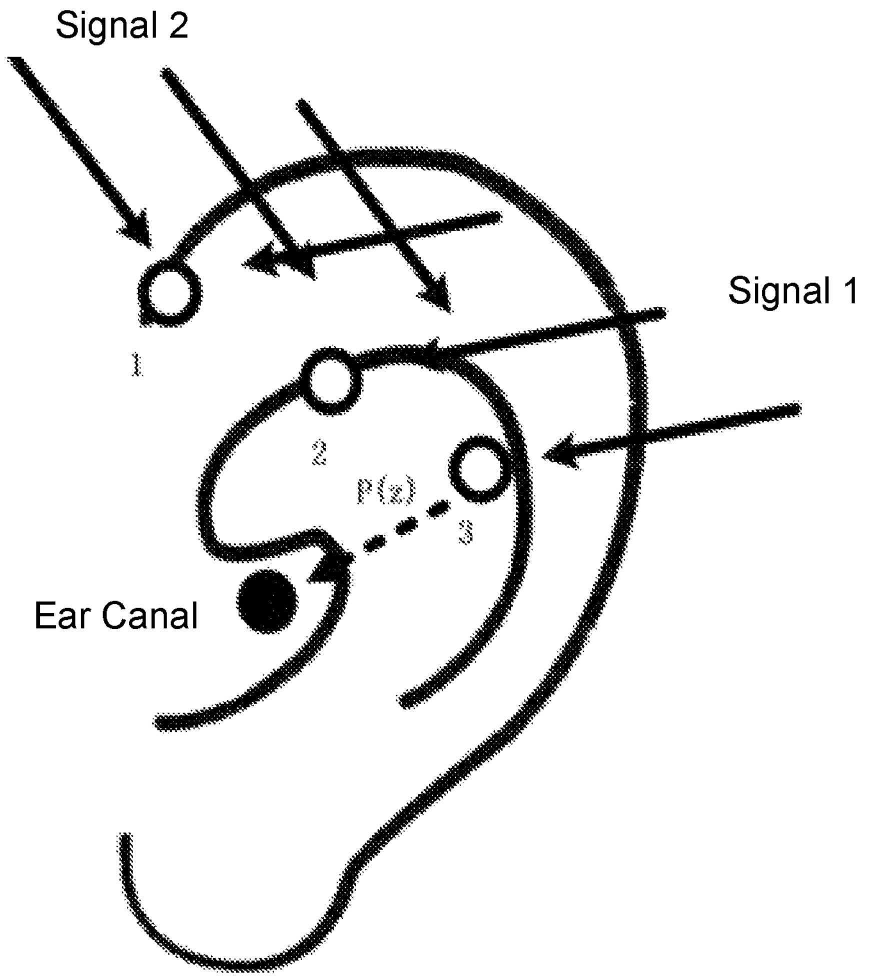
FIG. 5 is a schematic diagram illustrating an exemplary transmission of environmental noise of an open acoustic device according to some embodiments of the present disclosure.

The first microphone array 130 may convert the acquired environmental noise of different directions and different types into the electrical signal and transmit the electrical signal to the signal processor 140. The signal processor 140 may analyze the electrical signal corresponding to the environmental noise, thereby calculating the primary route transfer function from the first microphone array 130 to the ear canal of the user. The primary route transfer function may include a phase frequent response of the environmental noise transmitted from the first microphone array 130 to the ear canal of the user. The signal processor 140 may determine noise at the ear canal of the user according to the environmental noise acquired by the first microphone array 130 and the primary route transfer function. For an example of the primary route transfer function, please refer to the description of FIG. 5. FIG. 5 is a schematic diagram illustrating an exemplary transmission of environmental noise of an open acoustic device according to some embodiments of the present disclosure. As shown in FIG. 5, in some embodiments, the first microphone array 130 may have two or more microphones. When the user wears the open acoustic device, the open acoustic device 100 may be located near an ear of the user (e.g., a facial region in front of an auricle of the user, at the auricle of the user, or behind the auricle of the user, etc.). Accordingly, at this time, the two or more microphones in the first microphone array 130 may be located near the ear of the user (e.g., the facial region in front of the auricle of the user, at the auricle of the user, or behind the auricle of the user, etc.), and the first microphone array 130 may acquire the environmental noise from various directions. 1, 2, and 3 shown in FIG. 5 represent three microphones in the first microphone array 130. Black circles represent the ear canal, and solid line arrows represent the environmental noise signal from different directions. A dotted arrow represents a primary route transfer function from the first microphone array 130 to the ear canal. It can be seen from FIG. 5 that even if signals of two environmental noise signals (shown in FIG. 5, signal 1 and signal 2) from the different directions are the same when reaching the microphone 3, signals of two environmental noise signals from different directions may be different when reaching the ear canal. For example, phases of signal 1 and signal 2 may be different at the ear canal. By determining the primary route transfer function between the first microphone array 130 and the ear canal of the user, the environmental noise acquired by the first microphone array 130 may be converted into the noise at an opening of the ear canal of the user, so as to more accurately achieve noise reduction at the opening of the ear canal of the user. Specific descriptions regarding determining the primary route transfer function may be found in FIG. 6, FIG. 7 and relevant descriptions thereof.

In 430, a noise signal at the ear canal of the user may be estimated based on the environmental noise and the primary route transfer function.

In some embodiments, the operation may be executed by the signal processor 140.

The noise signal at the ear canal of the user may refer to a sound field of the environmental noise at the ear canal of the user. In some embodiments, the sound field at the ear canal may refer to a distribution and a change (e.g., a change over time, a change with position) of an acoustic wave at the opening of the ear canal or near the opening of the ear canal. A physical quantity of the sound field may include a sound pressure, a sound audio, a sound amplitude, a sound phase, a sound source vibration speed, a media (e.g., air) density, etc. In some embodiments, the physical quantity of the sound field may be a function of position and time. Since the open acoustic output device is located near the ear canal of the user without blocking the ear canal, a transmission route of the external environmental noise may be regarded that the external environmental noise is first acquired by a microphone in the first microphone array 130 first, and then transmitted to the ear canal of the user. In order to accurately determine the noise signal at the ear canal of the user, in some embodiments, the noise signal at the ear canal of the user may be estimated through the environmental noise acquired by the first microphone array 130 and the primary route transfer function. Specifically, the signal processor 140 may acquire relevant parameters (e.g., an amplitude, a phase, etc.) of the environmental noise according to the first microphone array 130, and estimate the noise signal at the opening of the ear canal according to the primary route transfer function from the first microphone array 130 to the ear canal.

In 440, a noise reduction signal may be generated based on the noise signal at the ear canal of the user.

In some embodiments, the operation may be executed by the signal processor 140.

In some embodiments, the signal processor 140 may generate the noise reduction signal based on the noise signal at the ear canal obtained in the operation 430. In order to ensure the noise reduction effect of the open acoustic device, in some embodiments, a phase of the noise reduction signal may be opposite or approximately opposite to the phase of the noise signal at the ear canal of the user. An amplitude of the noise reduction signal may be equal to or similar to the amplitude of the noise at the opening of the ear canal, so that the noise reduction acoustic wave output by the speaker based on the noise reduction signal may cancel the environmental noise at the ear canal of the user. In some embodiments, the user may also manually adjust the parameter information (e.g., the phase, the amplitude, etc.) of the noise reduction signal according to a usage scenario.

Merely by way of example, in some embodiments, an absolute value of a phase difference between the phase of the noise reduction signal and the phase of the noise signal at the ear canal may be in a preset phase range. In some embodiments, the preset phase range may be in 90 degrees-180 degrees. The absolute value of the phase difference between the phase of the noise reduction signal and the phase of the noise signal at the ear canal may be adjusted in the range according to a need of the user. For example, when the user does not want to be disturbed by sound of a surrounding environment, the absolute value of the phase difference may be a relatively large value, such as 180 degrees, i.e., the phase of the noise reduction signal may be opposite to the phase of the noise at the opening of the ear canal. As another example, when the user wants to be sensitive to the surrounding environment, for example, when the user crosses a road or is in a cycling state, the absolute value of the phase difference may be a relatively small value, such as 90 degrees. It should be noted that the more the user wants to receive the sound of the surrounding environment, the absolute value of the phase difference may be closer to 90 degrees. When the absolute value of the phase difference is close to 90 degrees, cancellation and superposition effects between the noise reduction signal and the noise signal at the ear canal of the user may be relatively weak, so that the user may receive more sound of the surrounding environment, and may not increase a volume of the noise signal heard by the ear canal of the user. The more sound of the surrounding environment the user wants to receive, the closer the absolute value of the phase difference may be to 180 degrees. In some embodiments, when the phase of the noise reduction signal and the phase of the noise at the opening of the ear canal satisfy a certain condition (for example, the phases may be opposite), a difference between the amplitude of the noise at the opening of the ear canal and the amplitude of the noise reduction signal may be in a preset amplitude range. For example, when the user does not want to be disturbed by the sound of the surrounding environment, the amplitude difference may be a relatively small value, e.g., 0 dB, that is, the amplitude of the noise reduction signal may be equal to the amplitude of the noise at the opening of the ear canal. As another example, when the user wants to be sensitive to the surrounding environment, the amplitude difference may be a relatively large value, for example, similar to the amplitude of the noise at the opening of the ear canal. It should be noted that the more environmental sound the user wants to receive, the closer the amplitude difference may be to the amplitude of the noise at the ear canal. The less environmental sound the user wants to receive, the closer the amplitude difference may be to 0 dB.

In 450, a noise reduction acoustic wave may be output according to the noise reduction signal.

In some embodiments, the operation may be executed by the speaker 150.

In some embodiments, the speaker 150 may convert the noise reduction signal (e.g., the electrical signal) based on a vibration component in the speaker 150 into the noise reduction acoustic wave. The noise reduction acoustic wave may cancel each other out with the environmental noise at the ear canal of the user. For example, when the environmental noise is first environmental noise, the environmental noise may be a sound field of the first environmental noise at the ear canal of the user. As another example, when there are a plurality of environmental noise, the environmental noise may include the first environmental noise and a second environmental noise. The environmental noise may refer to a sound field of the first environmental noise and the second environmental noise at the ear canal of the user. In some embodiments, the speaker 150 may output a target signal corresponding to the sound field at the ear canal of the user based on the noise reduction signal. In some embodiments, when the noise at the ear canal is the plurality of environmental noise, the speaker 150 may output noise reduction acoustic waves corresponding to the plurality of environmental noise based on the noise reduction signal. For example, the plurality of environmental noise may include the first environmental noise and the second environmental noise. The speaker 150 may output a first noise reduction acoustic wave with an approximately opposite phase and a similar amplitude to the noise of the first environmental noise and a second noise reduction acoustic wave with an approximately opposite phase and a similar amplitude to the noise of the second environmental noise to cancel the environmental noise. In some embodiments, when the speaker 150 is an air conduction speaker, a position where the noise reduction acoustic wave cancels out the environmental noise may be a position near the ear canal. A distance between the position near the ear canal and the ear canal of the user may be small. The noise near the opening of the ear canal may be approximately regarded as the noise at the position of the ear canal of the user. Therefore, the noise reduction acoustic wave and the noise near the ear canal may cancel each other out, which may be approximated that the environmental noise transmitted to the ear canal of the user is eliminated, thereby realizing active noise reduction of the open acoustic device 100. In some embodiments, when the speaker 150 is a bone conduction speaker, a position where the noise reduction acoustic wave and the environmental noise may be canceled may be a basilar membrane. The noise reduction acoustic wave and the environmental noise may be canceled at the basilar membrane of the user, thereby realizing the active noise reduction of the open acoustic device 100.

In some embodiments, the signal processor 140 may also update the noise reduction signal according to an input manually input by the user. For example, when the user wears the open acoustic device 100 in a relatively noisy external environment, a listening experience effect of the user is not ideal, the user may manually adjust the parameter information (e.g., frequency information, phase information, amplitude information) of the noise reduction signal according to the listening effect of the user. As another example, in a process of using the open acoustic device 100 by a special user (e.g., a hearing-impaired user or an older user), a hearing ability of the special user may be different from that of an ordinary user, and the noise reduction signal generated by the open acoustic device 100 may not meet a need of the special user, resulting in a poor listening experience of the special user. In this case, an adjustment multiple of the parameter information of the noise reduction signal may be preset, and the special user may adjust the noise reduction signal according to his/her own listening effects and the preset adjustment multiple of the parameter information of the noise reduction signal, thereby updating the noise reduction signal to improve the listening experience of the special user. In some embodiments, the users may manually adjust the noise reduction signal through a button on the open acoustic device 100. In other embodiments, the user may adjust the noise reduction signal through a terminal device. Specifically, the parameter information of the noise reduction signal suggested to the user may be displayed on the open acoustic device 100 or an external device (e.g., a mobile phone, a tablet computer, a computer) in communication with the open acoustic device 100. The user may fine-tune the parameter information according to his/her own listening experience.

It should be noted that the above description of the process 400 is merely provided for the purpose of illustration, and is not intended to limit the scope of the present disclosure. For persons having ordinary skills in the art, a plurality of modifications and variations may be made to the process 400 under the teachings of the present disclosure. For example, an operation may be increased, omitted, or merged in the process 400. As another example, signal processing (e.g., filtering, etc.) may also be performed on the environmental noise. However, those modifications and variations do not depart from the scope of the present disclosure.

Figure 6:
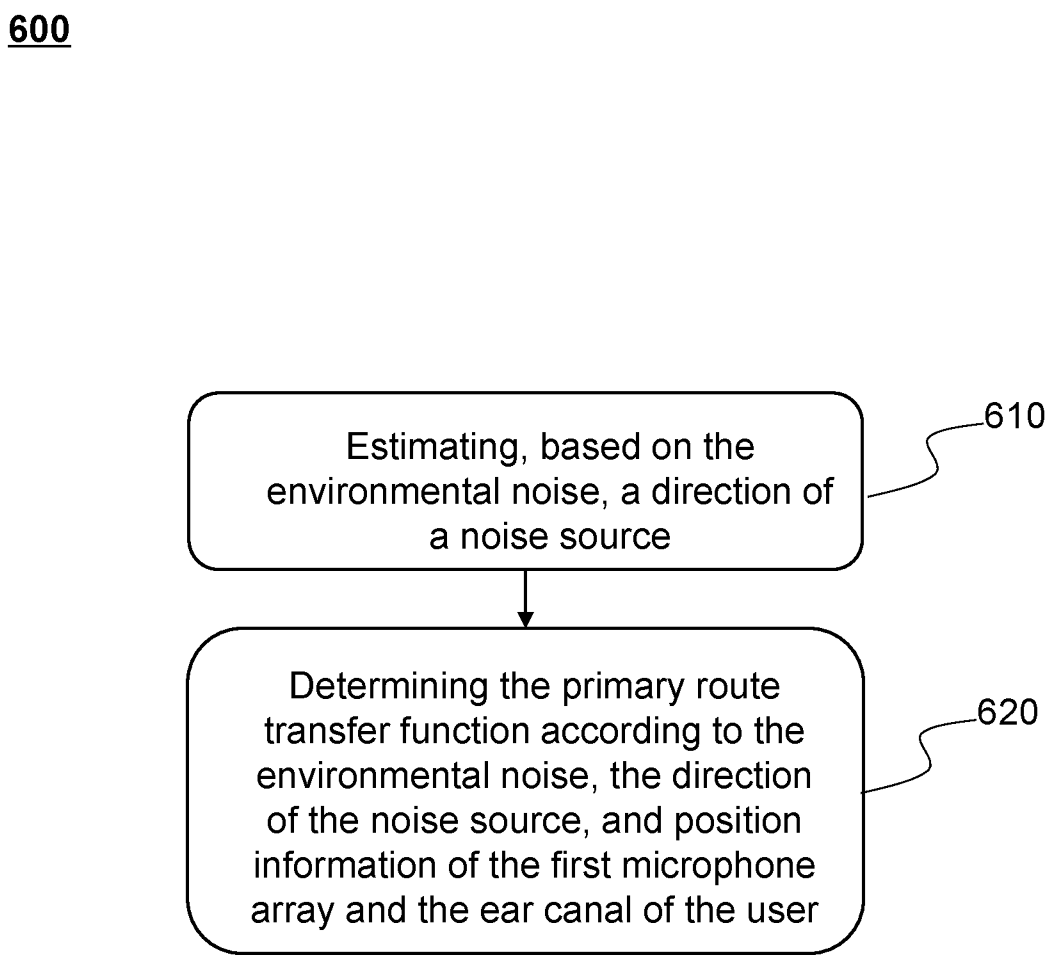
FIG. 6 is a flowchart illustrating an exemplary process for determining a primary route transfer function between a first microphone array and an ear canal of a user according to some embodiments of the present disclosure.

However, those variations and modifications do not depart from the scope of the present disclosure. In some embodiments, the operation 420 may be implemented through the process in FIG. 6. As shown in FIG. 6, the process 600 may include the following operations.

In 610, a direction of a noise source may be estimated based on the environmental noise.

In some embodiments, the operation may be executed by the signal processor 140.

The first microphone array 130 may convert the acquired environmental noise with different directions and different types into an electrical signal, and the electrical signal may be transmitted to the signal processor 140. The signal processor 140 may analyze the electrical signal corresponding to the environmental noise, and estimate the direction of the noise source through a noise positioning algorithm.

In some embodiments, the noise positioning algorithm may include a beamforming algorithm, a super-resolution spatial spectrum estimation algorithm, a time difference of arrival algorithm (also referred to as a delay estimation algorithm), or the like, or any combination thereof. The beamforming algorithm may be a sound-source positioning manner based on a controlled beam formed based on a maximum output power. Merely by way of example, the beamforming algorithm may include a steering response power-phase transform (SPR-PHAT) algorithm, a delay-and-sum beamforming algorithm, a differential microphone algorithm, a generalized sidelobe canceller (GSC) algorithm, a minimum variance distortion less response (MVDR) algorithm, etc. The super-resolution spatial spectrum estimation algorithm may include an autoregression (AR) model, a minimum variance (MV) spectrum estimation and eigenvalue decomposition manner (e.g., a multiple signal classification, (MUSIC) algorithm), etc. These manners may calculate a related matrix of a spatial spectrum by obtaining the environmental noise acquired by the microphone array, and effectively estimate the direction of the environmental noise source. The time difference of arrival algorithm may be performed first to estimate a time difference of arrival of sound and obtain the TDOA of the sound between microphones in the microphone array. The direction of the environmental noise source may be further positioned combined with a spatial position of the known microphone array using the TDOA of the sound.

For example, the delay estimation algorithm may determine the position of the noise source by calculating the time difference of the environmental noise signal transmitted to the different microphones in the microphone array and determining a geometric relationship. As another example, the SPR-PHAT algorithm may perform beamforming in a direction of each noise source. A direction with a strongest beam energy may be approximately regarded as the direction of the noise source. As yet another example, the MUSIC algorithm may obtain a subspace of the environmental noise signal by decomposing a covariance matrix of the environmental noise signal acquired by the microphone array, thereby separating the direction of the environmental noise. As another example, in some embodiments, the signal processor 140 may divide the acquired environmental noise into a plurality of frequency bands according to a specific frequency bandwidth (e.g. every 500 Hz as a frequency band). Each frequency band may correspond to a different frequency range respectively, and determine the environmental noise corresponding to the frequency band in at least one frequency band. For example, the signal processor 140 may obtain parameter information of the environmental noise corresponding to the each frequency band by performing signal analysis on the frequency band divided by the environmental noise. As yet another example, the signal processor 140 may determine the environmental noise corresponding to the each frequency band through the noise positioning algorithm.

In order to more clearly illustrate a principle of noise source positioning, the beamforming algorithm may be taken as an example to describe how the noise source positioning is realized in detail. Taking the microphone array as an example of a linear array, the noise source may be a far-field sound source. At this time, an incident acoustic wave from the noise source to the microphone array may be considered to be parallel. In a parallel sound field, when an incident angle of the incident acoustic wave from the noise source is perpendicular to a plane of microphones in the microphone array (e.g., the first microphone array 130 or the second microphone array 160), the incident acoustic wave may reach the each microphone in the microphone array (e.g., the first microphone array 130 or the second microphone array 160) simultaneously. In some embodiments, when the incident angle of the incident acoustic wave from the noise source in the parallel sound field is not perpendicular to the plane of microphones in the microphone array (e.g., the first microphone array 130 or the second microphone array 160), the incident acoustic wave may reach the each microphone in the microphone array (e.g., the first microphone array 130 or the second microphone array 160) with a delay, which may be determined by the incident angle. In some embodiments, for different incident angles, intensities of noise waveform after superposition may be different. For example, when the incident angle is 0°, the noise signal intensity may be relatively weak. When the incident angle is 45°, the noise signal intensity may be the strongest. When the incident angles are different, the superimposed waveform intensities of the noise waveforms may be different, so that the microphone array may have a polarity, thereby obtaining a polarity diagram of the microphone array. In some embodiments, the microphone array (e.g., the first microphone array 130 or the second microphone array 160) may be a directional array. Directivity of the directional array may be realized by a time domain algorithm or a frequency domain phase delay algorithm, e.g., delay, superposition, etc. In some embodiments, by controlling different delays, directivity of different directions may be achieved. In some embodiments, the directivity of the directional array is controllable, which may be equivalent to that a spatial filter first divides a noise positioning region into grids, delays each microphone in time domain through a delay time of each grid point, and finally superimposes the time domain delay of each microphone to calculate a sound pressure of each grid, thereby obtaining a relative sound pressure of each grid, and finally realizing the positioning of the noise source.

In 620, the primary route transfer function may be determined according to the environmental noise, the direction of the noise source, and position information of the first microphone array 130 and the ear canal of the user.

In some embodiments, the operation may be executed by the signal processor 140.

Figure 7:
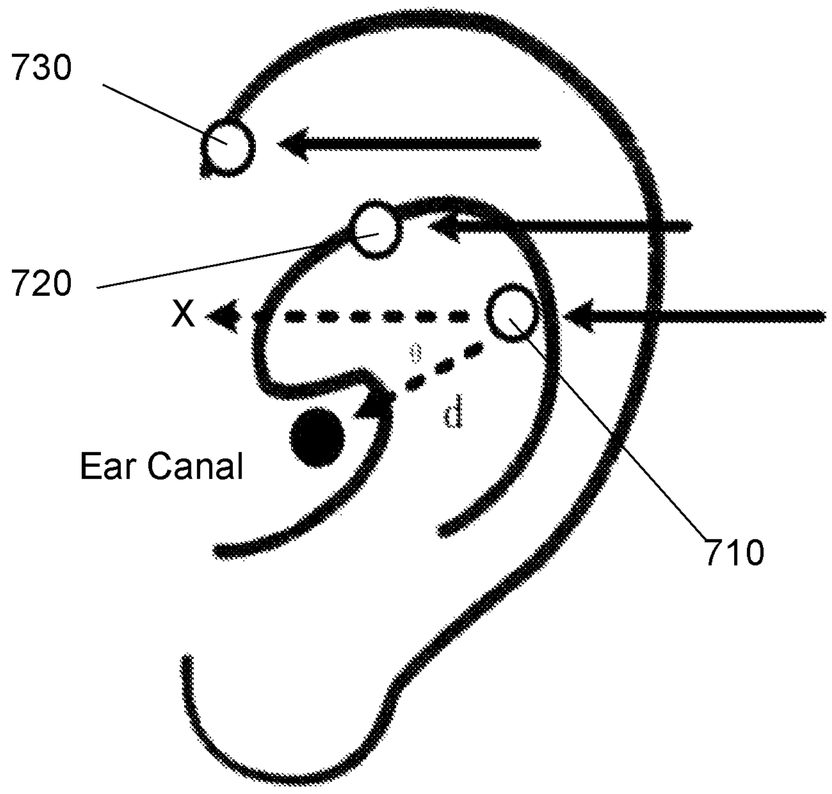
FIG. 7 is a schematic diagram illustrating determining a primary route transfer function from a first microphone array to an ear canal according to some embodiments of the present disclosure.

In some embodiments, the position information of the first microphone array 130 and the ear canal of the user may refer to a distance between any one microphone in the microphone array 130 and the ear canal of the user. For example, the first microphone array 130 may include a first microphone and a second microphone. The position information of the first microphone array 130 and the ear canal of the user may refer to a distance between the first microphone and the ear canal of the user. The first microphone may be a microphone closest to the ear canal of the user, or a microphone at another position. In some embodiments, the determining the primary route transfer function according to the environmental noise, the direction of the noise source, and the position information of the first microphone array 130 and the ear canal of the user may include determining the primary route transfer function based on a frequency of the environmental noise, the direction of the noise source, and the distance between the first microphone array and the ear canal of the user. Specific descriptions regarding determining the primary route transfer function may be found in FIG. 7 and relevant descriptions thereof. FIG. 7 is a schematic diagram illustrating determining a primary route transfer function from a first microphone array to an ear canal according to some embodiments of the present disclosure. As shown in FIG. 7, the first microphone array 130 may include a microphone 710, a microphone 720, and a microphone 730. The microphone 710, the microphone 720, and the microphone 730 may be located near the ear canal of the user. A distance between the first microphone array 130 and the opening of the ear canal may be regarded as a distance d between the microphone 710 and the opening of the ear canal of the user. An angle of a transmission direction X of the environmental noise relative to a connection line between the microphone 710 and the ear canal is θ. A frequency of the sound signal of the environmental noise acquired by the microphone 710 in the first microphone array 130 is ω. An amplitude of the sound signal of the environmental noise acquired by the microphone 710 in the first microphone array 130 is A. The transfer function from the microphone 710 in the first microphone array 130 to the opening of the ear canal may be expressed as $P(z)=A^{exp(-i*2\pi d\cos\theta/\omega)}$. The primary route transfer function may be calculated based on information such as the direction of the environmental noise source, etc. through the microphone 710 in the first microphone array 130 herein. It should be noted that, in a process of calculating the primary route transfer function, it is not limit to the microphone 710 in the first microphone array 130 and the noise signal acquired by the microphone 710. The microphone 720 or the microphone 730 and the noise signal acquired by the microphone 720 or the microphone 730 may also be applied.

It should be noted that the above description of the process 600 is merely provided for the purpose of illustration, and is not intended to limit the scope of the present disclosure. For persons having ordinary skills in the art, a plurality of modifications and variations may be made to the process 600 under the teachings of the present disclosure. However, those modifications and variations do not depart from the scope of the present disclosure.

In some embodiments, after the noise reduction acoustic wave output by the speaker based on the noise reduction signal is transmitted to the opening of the ear canal of the user, the parameter information (e.g., the phase information, the amplitude information, etc.) of the noise reduction acoustic wave may change, so that the noise reduction acoustic wave may not completely cancel the noise at the opening of the ear canal of the user. In order to improve the noise reduction effect of the open acoustic device, in some embodiments, the open acoustic device may further include the second microphone array. The second microphone array may acquire environmental noise and the noise reduction acoustic wave. The signal processor may be configured to estimate, based on the environmental noise acquired by the second microphone array and the noise reduction acoustic wave, noise at a first spatial position. The signal processor may be further configured to update, based on the noise at the first spatial position, the noise reduction signal. The first spatial position may be equivalently regarded as the ear canal of the user or a position near the ear canal of the user. In some embodiments, the first spatial position may be closer to the ear canal of the user than any microphone in the second microphone array.

Figure 8:
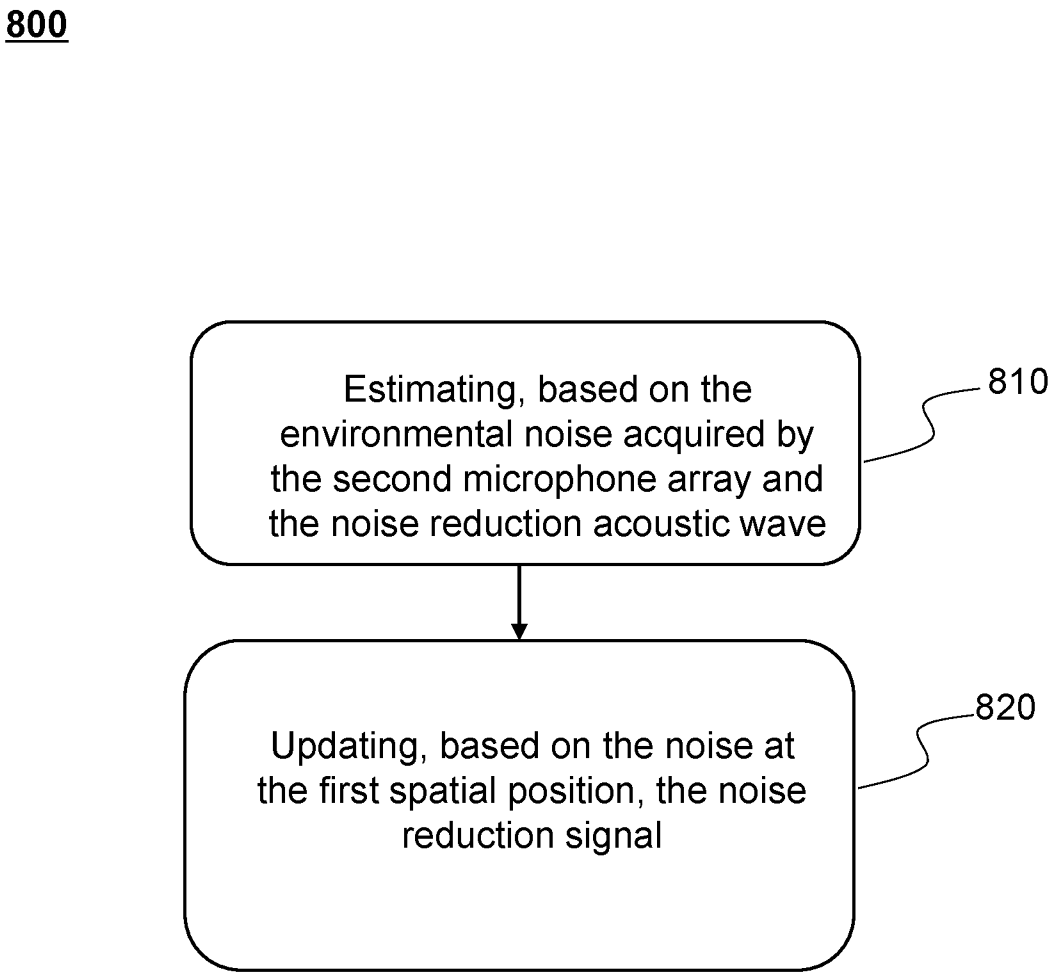
FIG. 8 is a flowchart illustrating an exemplary process for a second microphone array participating in work according to some embodiments of the present disclosure.

FIG. 8 is a flowchart illustrating an exemplary process for a second microphone array 160 participating in work according to some embodiments of the present disclosure. As shown in FIG. 8, the process 800 may include the following operations.

In 810, noise at a first spatial position may be estimated based on the environmental noise acquired by the second microphone array 160 and the noise reduction acoustic wave.

In some embodiments, the operation may be executed by the signal processor 140.

In some embodiments, the first spatial position may refer to a spatial position with a specific distance from the ear canal of the user. The first spatial position may be closer to the ear canal of the user than any microphone in the second microphone array 160. The specific distance herein may be a fixed distance, e.g., 0.5 cm, 1 cm, 2 cm, 3 cm, etc. In some embodiments, the first spatial position may be related to distribution positions relative to the ear of the user and a count of microphones in the second microphone array 160. The first spatial position may be adjusted by adjusting the distribution positions relative to the ear of the user and/or the count of the microphones in the second microphone array 160. For example, the first spatial position may be made closer to the ear canal of the user by increasing the count of the microphones in the second microphone array 160.

The signal processor 140 may estimate, based on the environmental noise acquired by the second microphone array 160 and the noise reduction acoustic wave, noise at the first spatial position. The environmental noise acquired by the second microphone array 160 may come from different azimuths and different types of spatial noise sources, so parameter information (e.g., phase information, amplitude information) corresponding to each spatial noise source may be different. In some embodiments, the signal processor 140 may perform signal separation and extraction on the noise at the first spatial position according to the statistical distribution and structural features of different types of noise in different dimensions (e.g., spatial domain, time domain, frequency domain, etc.), thereby estimating different types (e.g., different frequencies, different phases, etc.) of noise, and estimating the parameter information (e.g., amplitude information, phase information, etc.) corresponding to each noise. In some embodiments, the signal processor 140 may also determine overall parameter information of the noise at the first spatial position according to the parameter information corresponding to different types of noise at the first spatial position. In some embodiments, the estimating, based on the acquired environmental noise, noise at the first spatial position may further include determining one or more spatial noise sources associated with the acquired environmental noise, and estimating noise at the first spatial position based on the spatial noise sources. For example, the acquired environmental noise may be divided into a plurality of sub-bands. Each sub-band may correspond to a different frequency range, and in at least one sub-band, a spatial noise source corresponding to the sub-band may be determined. It should be noted that the spatial noise source estimated by the sub-band is a virtual noise source corresponding to an external real noise source herein.

The open acoustic device 100 may not block the ear canal of the user, and may not acquire the environmental noise by arranging a microphone at the ear canal. Therefore, the open acoustic device 100 may reconstruct the sound source at the ear canal through the second microphone array 160 to form the virtual sensor at the first spatial position. That is, a virtual sensor may be configured to represent or simulate audio data collected by a microphone located at the first spatial position. The audio data obtained by the virtual sensor may be similar or equivalent to the audio data collected by the physical sensor if a physical sensor is placed at the first spatial position. The first spatial position may be a spatial region constructed by the second microphone array 160 for simulating the position of the ear canal of the user in order to more accurately estimate the environmental noise transmitted at the ear canal of the user. In some embodiments, the first spatial position may be closer to the ear canal of the user than any microphone in the second microphone array 160. In some embodiments, the first spatial position may be related to distribution positions and a count of microphones in the second microphone array 160 relative to the ear of the user. The first spatial position may be adjusted by adjusting the distribution positions or the count of the microphones in the second microphone array 160 relative to the ear of the user. For example, by increasing the count of the microphones in the second microphone array 160, the first spatial position may be made closer to the ear canal of the user. As another example, the first spatial position may be made closer to the ear canal of the user by reducing a distance between the microphones in the second microphone array 160. As yet another example, the first spatial position may be made closer to the ear canal of the user by changing the arrangement of the microphones in the second microphone array 160.

The signal processor 140 may estimate parameter information of the noise at the first spatial position based on the parameter information (e.g. frequency information, amplitude information, phase information, etc.) of the environmental noise acquired by the second microphone array 160 and the noise reduction acoustic wave, thereby estimating the noise at the first spatial position. For example, in some embodiments, there may be a spatial noise source in front of and behind the body of the user. The signal processor 140 may estimate frequency information, phase information or amplitude information of the spatial noise source in front of the body of the user when the spatial noise source in front of the body of the user is transmitted to the first spatial position according to the frequency information, the phase information or the amplitude information of the spatial noise source in front of the body of the user. The signal processor 140 may estimate frequency information, phase information, or amplitude information of the spatial noise source behind the body of the user when the spatial noise source behind the body of the user is transmitted to the first spatial position according to the frequency information, the phase information or the amplitude information of the spatial noise source behind the body of the user. The signal processor 140 may estimate, based on the frequency information, the phase information, or the amplitude information of the spatial noise source in front of the body of the user, and the frequency information, the phase information, or the amplitude information of the s spatial noise source behind the body of the user, noise information at the first spatial position, thereby estimating the noise at the first spatial position. In some embodiments, the parameter information of the sound signal may be extracted from a frequency response curve of the sound signal acquired by the second microphone array 160 through a feature extraction technique. In some embodiments, the technique for extracting the parameter information of the sound signal may include, but is not limited to, a principal components analysis (PCA) technique, an independent component algorithm (ICA), a linear discriminant analysis (LDA) technique, a singular value decomposition (SVD) technique, etc.

In some embodiments, one or more spatial noise sources related to the acquired environmental noise may be determined by a noise positioning algorithm (e.g., a beamforming algorithm, a super-resolution spatial spectrum estimation algorithm, a time difference of arrival algorithm, etc.). Specific descriptions regarding performing the noise source positioning through the noise positioning algorithm may be found in relevant descriptions of FIG. 6, which will not be repeated herein.

In 820, the noise reduction signal may be updated based on the noise at the first spatial position.

In some embodiments, the operation may be executed by the signal processor 140.

In some embodiments, the signal processor 140 may adjust the parameter information (e.g., frequency information, amplitude information and/or phase information) of the noise reduction signal according to the parameter information of the noise (sound field) at the first spatial position obtained in the operation 810, so that the updated amplitude information and frequency information of the noise reduction signal may be more consistent with the amplitude information and frequency information of the environmental noise at the ear canal of the user, and the updated phase information of the noise reduction signal may be more consistent with inverse phase information of the environmental noise at the ear canal of the user. Therefore, the updated noise reduction signal may more accurately eliminate the environmental noise. The second microphone array 160 may need to monitor the sound field at the ear canal of the user after the noise reduction signal and the environmental noise are canceled. The signal processor 140 may estimate the sound signal at the first spatial position (e.g., at the ear canal) based on the noise reduction acoustic wave and the environmental noise picked up by the second microphone array 160, so as to determine whether the noise reduction acoustic wave at the ear canal and the environmental noise are completely canceled. The signal processor 140 may estimate the sound field at the ear canal through the sound signal acquired by the second microphone array 160 to update the noise reduction signal, which can further improve the noise reduction effect and listening experience of the user.

It should be noted that the above description of the process 800 is merely provided for the purpose of illustration, and is not intended to limit the scope of the present disclosure. For persons having ordinary skills in the art, a plurality of modifications and variations may be made to the process 800 under the teachings of the present disclosure. However, those modifications and variations do not depart from the scope of the present disclosure.

The speaker of the open acoustic device may be located near the ear canal of the user, and a transfer route of the noise reduction acoustic wave output by the speaker based on the noise reduction signal may be transmitted from the speaker to the ear canal of the user (i.e., an overall secondary route). Specifically, the specific route from the speaker to the ear canal of the user may be divided into a first secondary transfer route from the speaker to the second microphone array and a second secondary transfer route from the second microphone array to the ear canal of the user. After the noise reduction acoustic wave generated by the speaker based on the noise reduction signal (the noise reduction signal generated based on the noise signal at the ear canal) is transmitted to the opening of the ear canal of the user, the parameter information (e.g., phase information, amplitude information, etc.) of the noise reduction acoustic wave may be changed, so that the noise reduction acoustic wave may not completely cancel the noise at the opening of the ear canal of the user. In order to improve the noise reduction effect of the open acoustic device, in some embodiments, the signal processor may determine an overall secondary route transfer function between the speaker and the ear canal of the user based on the sound signal acquired by the second microphone array, and generate the noise reduction signal based on the overall secondary route transfer function and the noise at the ear canal of the user, so that the noise reduction acoustic wave generated by the speaker may completely cancel the noise at the opening of the ear canal when transmitted to the opening of the ear canal of the user. Specific descriptions regarding generating the noise reduction signal based on the noise signal at the ear canal of the user may be found in FIGS. 9-12 and relevant descriptions thereof.

Figure 9:
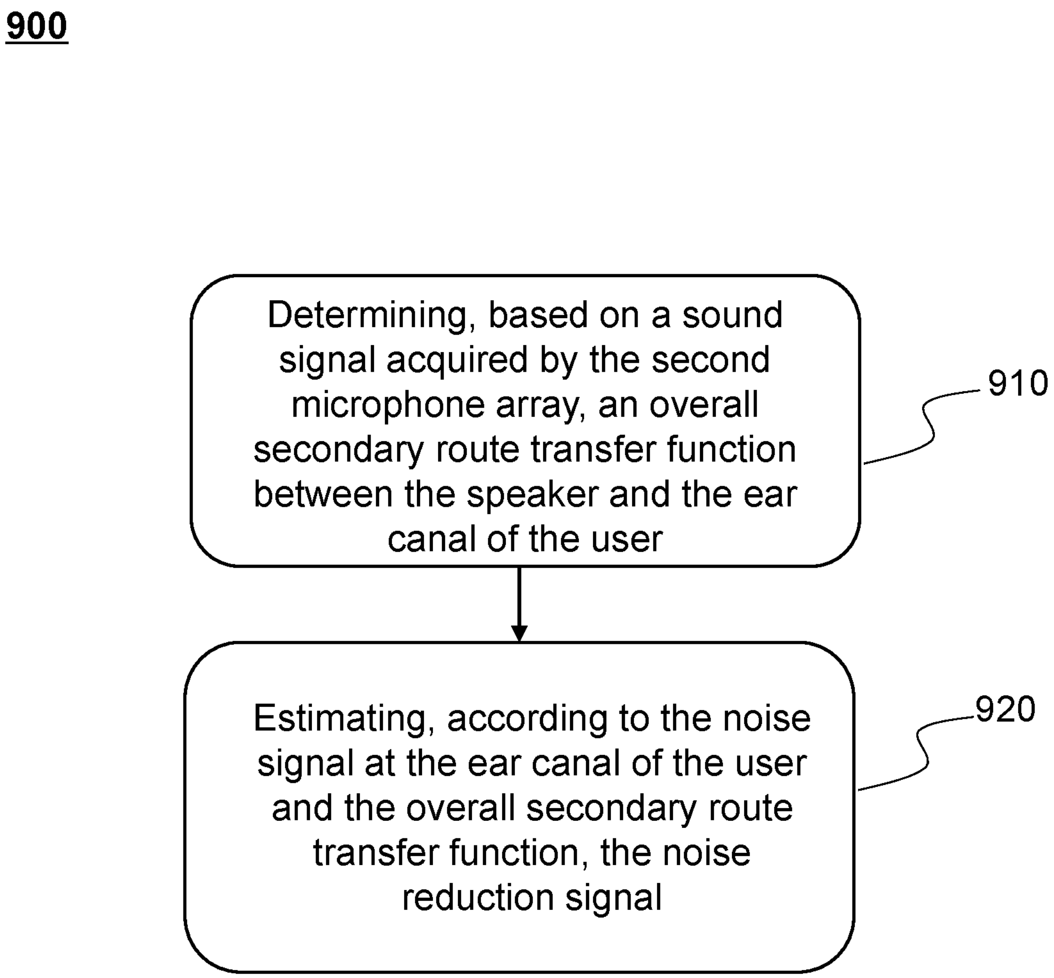
FIG. 9 is another flowchart illustrating an exemplary process for a second microphone array participating in work according to some embodiments of the present disclosure.

FIG. 9 is another flowchart illustrating an exemplary process for a second microphone array 160 participating in work according to some embodiments of the present disclosure. As shown in FIG. 9, the process 900 may include the following operations.

In 910, an overall secondary transfer route function between the speaker 150 and the ear canal of the user may be determined based on a sound signal acquired by the second microphone array 160.

In some embodiments, the operation may be executed by the signal processor 140. In some embodiments, a transmission route of the sound signal from the speaker 150 to the ear canal may be referred to as the overall secondary route. The overall secondary route transfer function S(z) may refer to a phase-frequency response of the sound signal (such as a noise reduction acoustic wave emitted by the speaker 150) from the speaker 150 to the ear canal of the user, which may reflect influence of the overall secondary route on the sound signal. The signal processor 140 may estimate the noise reduction signal based on the overall secondary route transfer function S(z) and the sound signal at the ear canal of the user. Specific descriptions regarding the overall secondary route transfer function S(z) may be found in FIG. 11, a process 1100, and relevant descriptions thereof, which will not be repeated herein.

In some noise reduction scenarios, if the influence of the overall secondary route on the sound signal is not considered, the noise reduction effect of the noise reduction acoustic wave emitted by the speaker 150 may not be good, so that a noise reduction acoustic wave signal output by the speaker 150 at the ear canal may not completely cancel an environmental noise signal at the ear canal. In order to improve this problem, the overall secondary route transfer function S(z) may be calculated to compensate the noise reduction acoustic wave emitted by the speaker 150, thereby enhancing the noise reduction effect of the noise reduction acoustic wave emitted by the speaker 150 at the ear canal of the user.

In 920, the noise reduction signal may be estimated according to the noise signal at the ear canal of the user and the overall secondary route transfer function S(z).

In some embodiments, the operation may be executed by the signal processor 140.

In some embodiments, the signal processor 140 may compensate the noise reduction signal based on the overall secondary route S(z) calculated in the operation 910, so that the noise reduction acoustic wave finally emitted by the speaker may cancel the environmental noise at the ear canal after being adjusted by the overall secondary route transfer function. For example, the signal processor 140 may adjust parameter information (e.g., frequency information, amplitude information, phase information) of the noise reduction signal according to the environmental noise signal (e.g., a sound pressure, a sound frequency, a sound amplitude, a sound phase, a sound source vibration velocity, or a medium (e.g. air) density, etc.) at the ear canal.

In some embodiments, the operation 920 may be included in the operation 440.

It should be noted that the above description of the process 900 is merely provided for the purpose of illustration, and is not intended to limit the scope of the present disclosure. For persons having ordinary skills in the art, a plurality of modifications and variations may be made to the process 900 under the teachings of the present disclosure. However, those modifications and variations do not depart from the scope of the present disclosure.

Figure 10:
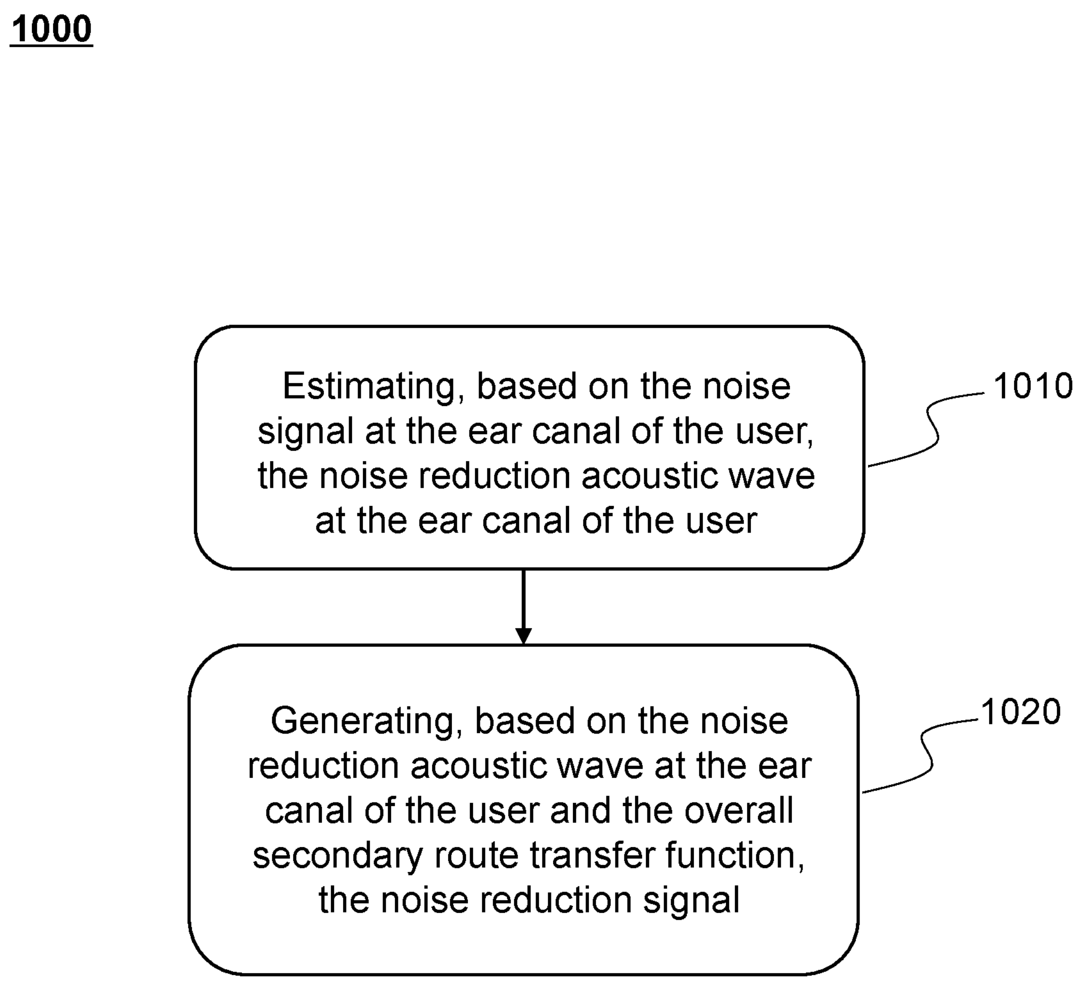
FIG. 10 is a flowchart illustrating an exemplary process for estimating a noise reduction signal according to some embodiments of the present disclosure.

FIG. 10 is a flowchart illustrating an exemplary process for estimating a noise reduction signal according to some embodiments of the present disclosure. That is, FIG. 10 is an exemplary flowchart illustrating the operation 920. As shown in FIG. 10, the process 1000 (the operation 920) may include the following operations.

In 1010, the noise reduction acoustic wave at the ear canal of the user may be estimated based on the noise signal at the ear canal of the user.

In some embodiments, the operation may be executed by the signal processor 140.

In some embodiments, by performing in a similar manner to the operation 440, a noise reduction signal at the ear canal of the user may be estimated, so that the noise reduction acoustic wave at the ear canal of the user may be estimated.

In 1020, the noise reduction signal may be generated based on the noise reduction acoustic wave at the ear canal of the user and the overall secondary route transfer function S(z).

In some embodiments, the operation may be executed by the signal processor 140.

In some embodiments, the signal processor 140 may adjust parameter information (e.g., frequency information, amplitude information, phase information) of the noise reduction signal according to the estimated noise reduction acoustic wave (e.g., a sound pressure, a sound frequency, a sound amplitude, a sound phase, a sound source vibration velocity, a medium (e.g., air) density, etc.) at the ear canal of the user.

It should be noted that the above description of the process 1000 is merely provided for the purpose of illustration, and is not intended to limit the scope of the present disclosure. For persons having ordinary skills in the art, a plurality of modifications and variations may be made to the process 1000 under the teachings of the present disclosure. However, those modifications and variations do not depart from the scope of the present disclosure.

Figure 11:
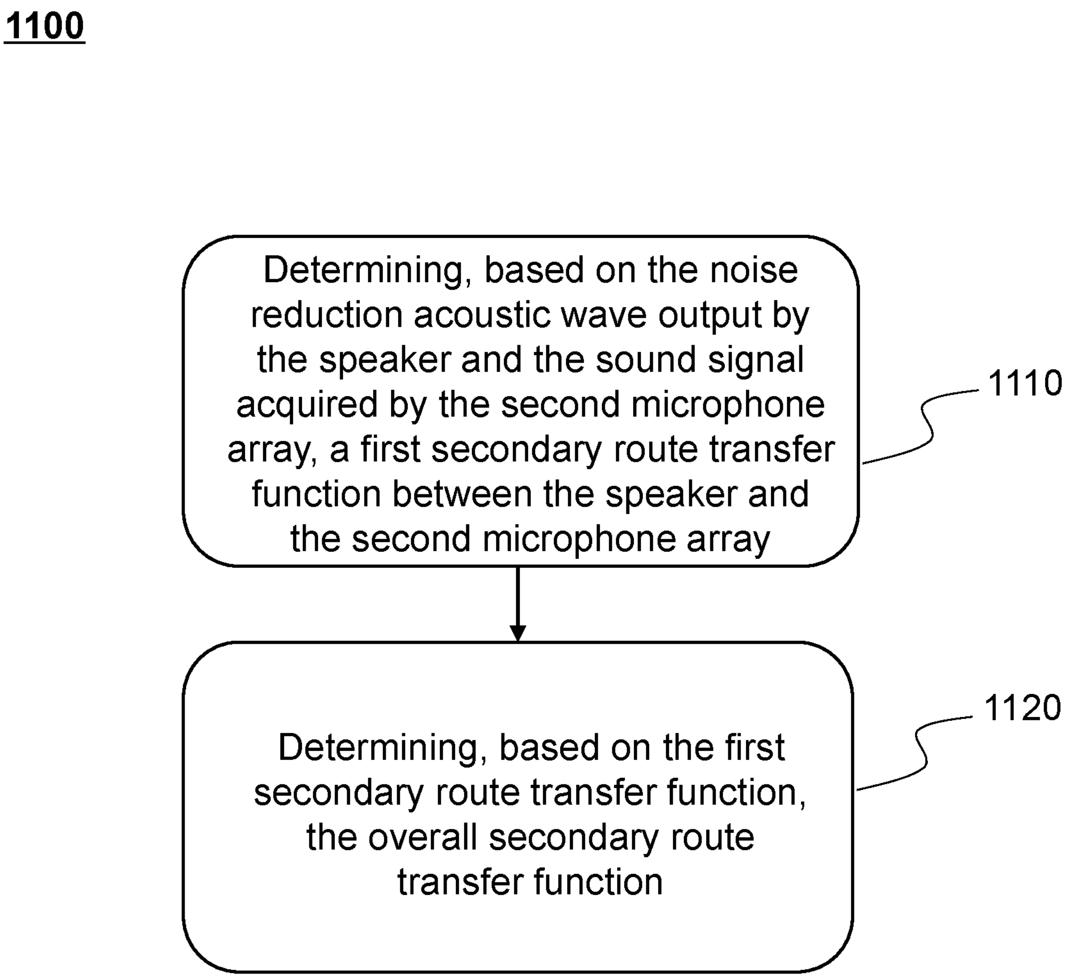
FIG. 11 is a flowchart illustrating an exemplary process for determining an overall secondary route transfer function according to some embodiments of the present disclosure.

FIG. 11 is a flowchart illustrating an exemplary process for determining an overall secondary route transfer function S(z) according to some embodiments of the present disclosure. That is, FIG. 11 is an exemplary flowchart illustrating the operation 910. As shown in FIG. 11, the process 1100 (the operation 910) may include the following operations.

In 1110, a first secondary route transfer function between the speaker 150 and the second microphone array 160 may be determined based on the noise reduction acoustic wave output by the speaker 150 and the sound signal acquired by the second microphone array 160.

In some embodiments, the operation may be executed by the signal processor 140. Specifically, a transmission route of the sound signal (e.g., the noise reduction acoustic wave output by the speaker 150) from the speaker 150 to the second microphone array 160 may be referred to the first secondary route. The first secondary route transfer function S(z1) may refer to a frequency response of the sound signal (e.g., the noise reduction acoustic wave output by the speaker 150) from the speaker 150 to the second microphone array 160, which may reflect influence of the first secondary route on the sound signal. A face may reflect the acoustic wave, and ways of wearing of different people may affect the first secondary route transfer function. In some embodiments, the speaker 150 and the second microphone array 160 may convert the output noise reduction sound signal and the acquired sound signal into electrical signals and transmit the electrical signals to the signal processor 140. The signal processor 140 may process the two electrical signals and calculate the first secondary route transfer function S(z1). For example, the first secondary route transfer function S(z1) may be expressed as a ratio of the sound signal acquired by the second microphone array 160 to the noise reduction sound signal output by the speaker 150.

In 1120, the overall secondary route transfer function may be determined based on the first secondary route transfer function.

In some embodiments, this step can be executed by the signal processor 140. In some embodiments, the signal processor 140 may be configured to determine the overall secondary route transfer function S(z) based on the first secondary route transfer function S(z1). In some embodiments, the determining, based on the first secondary route transfer function, the overall secondary route transfer function may include determining, based on the first secondary route transfer function, a second secondary route transfer function between the second microphone array and the ear canal of the user; and determining, based on the first secondary route transfer function and the second secondary route transfer function, the overall secondary route transfer function. A transmission route of the sound signal from the second microphone array 160 to the ear canal of the user may be referred to the second secondary route. The second secondary route transfer function S(z2) may refer to a frequency response of the sound signal (e.g., the noise reduction acoustic wave output by the speaker 150) from the second microphone array 160 to the ear canal of the user, which may reflect influence of the second secondary route on the sound signal. The first secondary route transfer function S(z1) and the second secondary route transfer function S(z2) may have a certain relationship (e.g., the second secondary route transfer function S(z2)=f(S(z1))). The second secondary route transfer function S(z2) may be determined through the first secondary route transfer function S(z1). In some embodiments, the second secondary route transfer function through a trained machine learning model or a preset model may be determined based on the first secondary route transfer function. Specifically, the second secondary route transfer function S(z2) may be output by inputting the first secondary route transfer function S(z1) in the trained machine learning model or the preset model. In some embodiments, the machine learning model may include a Gaussian mixture model, a deep neural network model, or the like, or any combination thereof.

In some embodiments, the preset model may be obtained through manual test statistics. At this time, the second secondary route transfer function S(z2) may not be determined by the first secondary route transfer function S(z1). In some embodiments, in order to achieve a purpose of allowing the ears and the ear canal of the user being unblocked, the second microphone array 160 may not be disposed in the ear canal of the user, so the second secondary route transfer function S(z2) in the open acoustic device 100 may not be fixed. At this time, in a product debugging stage, one or more signal generation device may be disposed at a position of the second microphone array 160, and one or more sensors may be disposed at the ear canal. The one or more sensors disposed at the ear canal may receive the sound signal output by the signal generation device. Finally, the sound signal output by the signal generation device and the sound signal acquired by the one or more sensors disposed at the ear canal may be converted into the electrical signals, and the electrical signals may be transmitted to the signal processor 140, respectively. The signal processor 140 may analyze the two electrical signals and calculate the second secondary route transfer function S(z2). Further, the signal processor 140 may calculate a relationship S(z2)=f(S(z1)) between the second secondary route transfer function S(z2) and the first secondary route transfer function S(z1).

In some embodiments, the overall secondary route transfer function S(z) may be calculated based on the first secondary route transfer function S(z1) and the second secondary route transfer function S(z2). For example, considering that the overall secondary route transfer function, the first secondary route transfer function S(z1), and the second secondary route transfer function S(z2) may be affected by a surrounding environment (e.g., a face wearing the open acoustic device 100) of the open acoustic device 100, the overall secondary route transfer function and the first secondary route transfer function S(z1) and the second secondary route transfer function S(z2) may satisfy a certain functional relationship (e.g., S(z)=f(S(z1), S(z2)). The signal processor 140 may obtain the overall secondary route transfer function in an actual use process by calling the function relationship.

It should be noted that the above description of the process 1100 is merely provided for the purpose of illustration, and is not intended to limit the scope of the present disclosure. For persons having ordinary skills in the art, a plurality of modifications and variations may be made to the process 1100 under the teachings of the present disclosure. However, those modifications and variations do not depart from the scope of the present disclosure.

Figure 12:
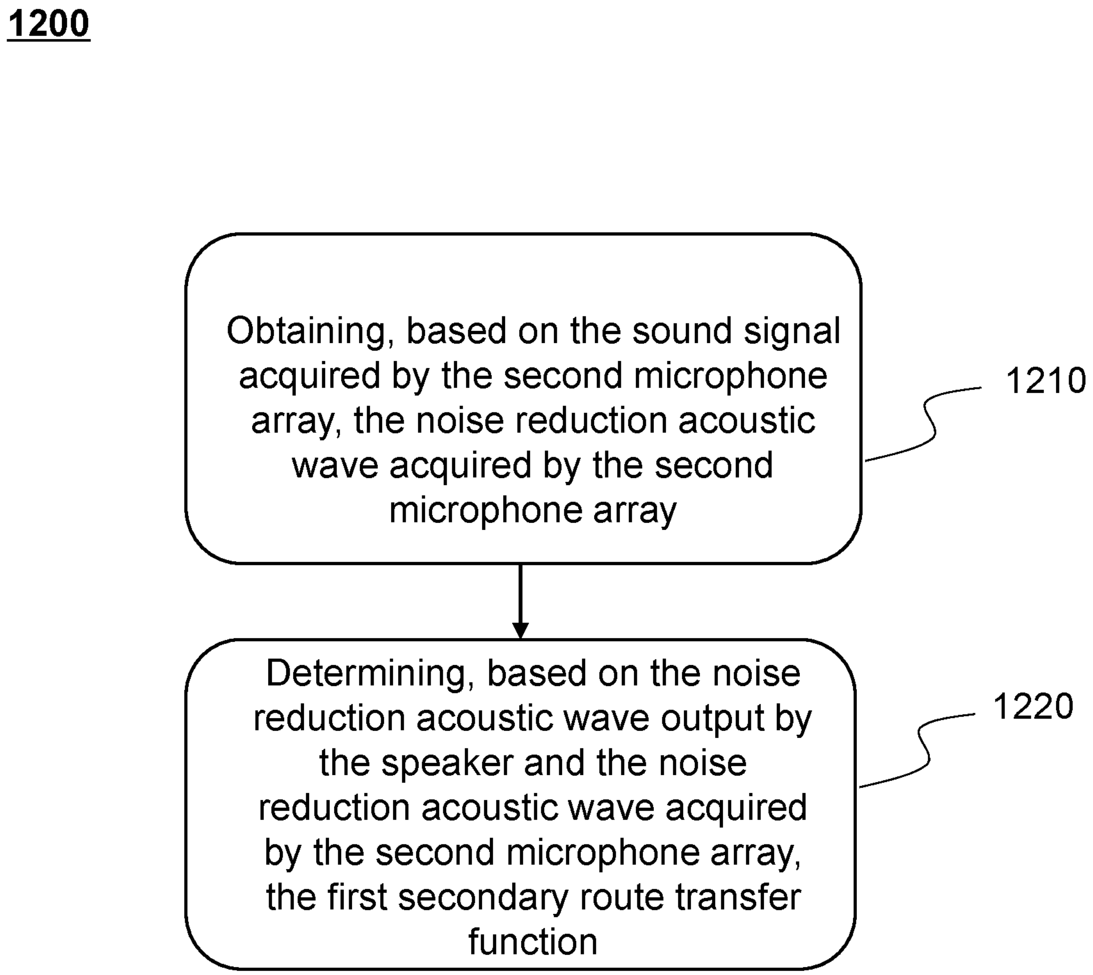
FIG. 12 is a flowchart illustrating an exemplary process for determining a first secondary route transfer function according to some embodiments of the present disclosure.

FIG. 12 is a flowchart illustrating an exemplary process for determining a first secondary route transfer function based on a noise reduction acoustic wave output by the speaker 150 and a sound signal acquired by the second microphone array 160 according to some embodiments of the present disclosure. That is, FIG. 12 is an example flowchart illustrating the operation 1110. As shown in FIG. 12, the process 1200 (the operation 1110) may include the following operations.

In 1210, the noise reduction acoustic wave acquired by the second microphone array 160 may be obtained based on the sound signal acquired by the second microphone array 160.

In some embodiments, the operation may be executed by the signal processor 140. In some embodiments, the signal processor 140 may determine, based on the sound signal acquired by the second microphone array 160, the noise reduction acoustic wave acquired by the second microphone array 160. The execution method of the operation 1210 is similar to the execution method of the operation 1010, which will not be repeated herein.

In 1220, the first secondary route transfer function S(z1) may be determined based on the noise reduction acoustic wave output by the speaker 150 and the noise reduction acoustic wave acquired by the second microphone array 160.

In some embodiments, the operation may be executed by the signal processor 140. The signal processor 140 may calculate, based on the noise reduction acoustic wave output by the speaker 150 and the noise reduction acoustic wave acquired by the second microphone array 160, the first secondary route transfer function S(z1) of the speaker 150 to the second microphone array 160. Specifically, for example, the speaker 150 may play a standard sound. The second microphone array 160 may acquire the standard sound signal output by the speaker 150. The signal processor 140 may compare relevant parameters (e.g., frequency information, amplitude information, phase information) of the sound signal output by the speaker 150 and related parameters (e.g., frequency information, amplitude information, phase information) of the sound signal received by the second microphone array 160, thereby calculating the first secondary route transfer function S(z1) from the speaker 150 to the second microphone array 160. In some embodiments, the speaker 150 may play a prompt sound, or may play a sound signal such as a secondary acoustic wave that is not easy to attract attention of the user, so as to obtain the first secondary route transfer function S(z1).

It should be noted that the above description of the process 1200 is merely provided for the purpose of illustration, and is not intended to limit the scope of the present disclosure. For technicians in the art, under the guidance of this manual, various amendments and changes can be made on the process 1200. However, those modifications and variations do not depart from the scope of the present disclosure.

Figure 13A:
FIG. 13A is a schematic diagram illustrating an exemplary distribution of a microphone array according to some embodiments of the present disclosure.
Figure 13B:
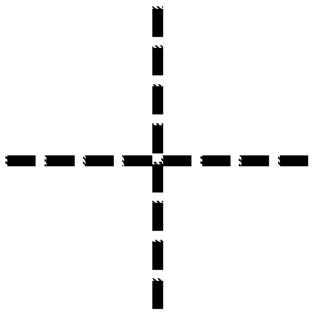
FIG. 13B is a schematic diagram illustrating an exemplary distribution of another microphone array according to some embodiments of the present disclosure.
Figure 13C:
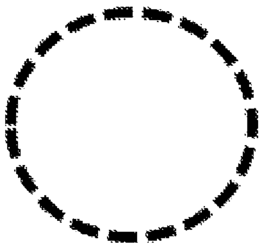
FIG. 13C is a schematic diagram illustrating an exemplary distribution of still another microphone array according to some embodiments of the present disclosure.
Figure 13D:
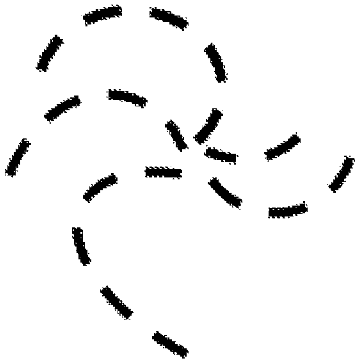
FIG. 13D is a schematic diagram illustrating an exemplary distribution of still yet another microphone array according to some embodiments of the present disclosure.

FIGS. 13A-13D are schematic diagrams illustrating distribution of a microphone array (e.g., the first microphone array) according to some embodiments of the present disclosure. In some embodiments, an arrangement of the microphone array may be a regular geometry. As shown in FIG. 13A, the microphone array is a linear array. In some embodiments, the arrangement of the microphone array may also be other shapes. For example, as shown in FIG. 13B, the microphone array is a cross-shaped array. As another example, as shown in FIG. 13C, the microphone array may be a circular array. In some embodiments, the arrangement of the microphone array may also be an irregular geometry. For example, as shown in FIG. 13D, the microphone array is an irregular array. It should be noted that the arrangement of the microphone array is not limited to the linear array, the cross-shaped array, the circular array, the irregular array shown in FIG. 13A-13D, or the arrangement of the microphone array may also be an array of other shapes, such as a triangular array, a spiral array, a plane array, a three-dimensional array, a radiation array, etc., which is not limited in the present disclosure.

In some embodiments, each short solid line in FIGS. 13A-13D may be considered as a microphone or a group of microphones. When each short solid line is considered a group of microphones, a count of each group of microphones may be the same or different, a type of each group of microphones may be the same or different, and an orientation of each group of microphones may be the same or different. The type, the count, and the orientation of the microphone may be adjusted according to an actual application, which will not be limited in the present disclosure.

In some embodiments, the microphones in the microphone array may be uniformly distributed. The uniform distribution herein may refer to a same distance between any adjacent two microphones in the microphone array. In some embodiments, the microphone in the microphone array may also be non-uniformly distributed. The non-uniform distribution herein may refer to a different distance between any adjacent two microphones in the microphone array. The distance between the microphones in the microphone array may be adjusted according to an actual situation, which will not be limited in the present disclosure.

Figure 14A:
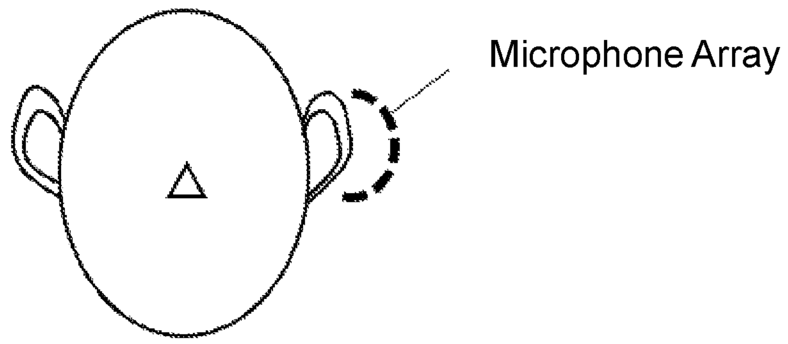
FIG. 14A is a schematic diagram illustrating exemplary arrangement of a microphone array when a user wears an open acoustic device according to some embodiments of the present disclosure.
Figure 14B:
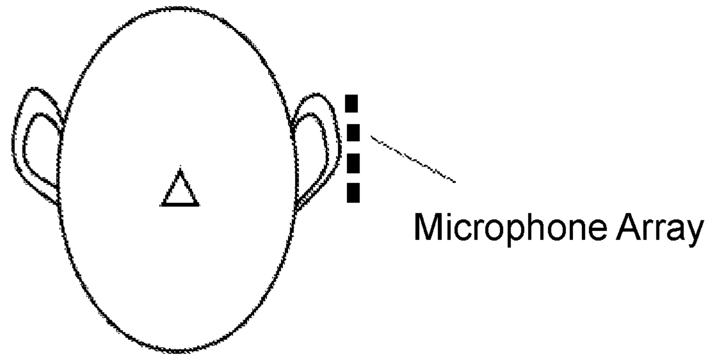
FIG. 14B is a schematic diagram illustrating exemplary arrangement of another microphone array when a user wears an open acoustic device according to some embodiments of the present disclosure.

FIGS. 14A-14B are schematic diagrams illustrating arrangements of a microphone array (e.g., the first microphone array 130) according to some embodiments of the present disclosure. As shown in FIG. 14A, when the user wears an acoustic device with a microphone array, the microphone array may be arranged at or around the ear of the user in a semicircular arrangement. As shown in FIG. 14B, the microphone array may be arranged at the ear of the user in a linear arrangement. It should be noted that the arrangement of the microphone array is not limited to the semicircular and linear shown in FIGS. 14A-14B. The position of the microphone array is not limited to the position shown in FIGS. 14A-14B. The semicircular and linear and the position of the microphone array herein is merely provided for the purpose of the illustration.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "data block," "module," "engine," "unit," "component," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An open acoustic device, comprising: a fixing structure configured to place the acoustic device near an ear of a user without blocking an ear canal of the user; a first microphone array configured to acquire environmental noise; a signal processor configured to: determine, based on the environmental noise, a primary route transfer function between the first microphone array and the ear canal of the user; generate, based on the environmental noise and the primary route transfer function, a noise reduction signal; and a speaker configured to output, according to the noise reduction signal, a noise reduction acoustic wave, the noise reduction acoustic wave being configured to eliminate noise signal at the ear canal of the user, wherein determining, based on the environmental noise, the primary route transfer function between the first microphone array and the ear canal of the user includes: estimating, based on the environmental noise, a direction of a noise source; and determining the primary route transfer function according to the environmental noise, the direction of the noise source, and position information of the first microphone array and the ear canal of the user, wherein the speaker includes two sound guiding holes, and the first microphone array is located near a mid-perpendicular line of a connecting line between the two sound guiding holes so that the microphones is in a region where a sound pressure level of the speaker is minimum.

2. The open acoustic device of claim 1, wherein the two sound guiding holes output a set of sound signals with approximately opposite phases.

3. The open acoustic device of claim 1, wherein the two sound guiding holes output a set of sound signals with similar amplitudes.

4. The open acoustic device of claim 3, wherein the position information of the first microphone array and the ear canal of the user includes a distance between the first microphone array and the ear canal of the user, and the determining the primary route transfer function according to the environmental noise, the direction of the noise source, and the position information of the first microphone array and the ear canal of the user includes: determining the primary route transfer function based on a frequency of the environmental noise, the direction of the noise source, and the distance between the first microphone array and the ear canal of the user.

5. The open acoustic device of claim 3, wherein the estimating, based on environmental noise, a direction of a noise source includes: estimating the direction of the noise source through at least one of a beamforming algorithm, a super-resolution spatial spectrum estimation algorithm, or a time difference of arrival algorithm.

6. The open acoustic device of claim 1, wherein in a frequency range of 150 Hz-2000 Hz, a noise reduction depth of the open acoustic device is 5 dB-25 dB.

7. The open acoustic device of claim 1, further comprising a second microphone array configured to acquire environmental noise and the noise reduction acoustic wave;

the signal processor is configured to estimate, based on the environmental noise acquired by the second microphone array and the noise reduction acoustic wave, noise at a first spatial position, the first spatial position being closer to the ear canal of the user than any microphone in the second microphone array; and update, based on the noise at the first spatial position, the noise reduction signal.

8. The open acoustic device of claim 1, further comprising a second microphone array configured to acquire environmental noise and the noise reduction acoustic wave;

the signal processor is configured to determine, based on a sound signal acquired by the second microphone array, an overall secondary route transfer function between the speaker and the ear canal of the user; and generating, based on the environmental noise and the primary route transfer function, a noise reduction signal includes:

estimating, based on the environmental noise and the primary route transfer function, a noise signal at the ear canal of the user; and estimating, according to the noise signal at the ear canal of the user and the overall secondary route transfer function, the noise reduction signal.

9. The open acoustic device of claim 8, wherein the estimating, according to the noise signal at the ear canal of the user and the overall secondary route transfer function, the noise reduction signal includes:

estimating, based on the noise signal at the ear canal of the user, the noise reduction acoustic wave at the ear canal of the user; and generating, based on the noise reduction acoustic wave at the ear canal of the user and the overall secondary route transfer function, the noise reduction signal.

10. The open acoustic device of claim 8, wherein the determining, based on a sound signal picked by the second microphone array, an overall secondary route transfer function includes:

determining, based on the noise reduction acoustic wave output by the speaker and the sound signal acquired by the second microphone array, a first secondary route transfer function between the speaker and the second microphone array; and determining, based on the first secondary route transfer function, the overall secondary route transfer function.

11. The open acoustic device of claim 10, wherein the determining, based on the noise reduction acoustic wave output by the speaker and the sound signal picked up by the second microphone array picker, a first secondary route transfer function includes:

obtaining, based on the sound signal acquired by the second microphone array, the noise reduction acoustic wave acquired by the second microphone array; and determining, based on the noise reduction acoustic wave output by the speaker and the noise reduction acoustic wave acquired by the second microphone array, the first secondary route transfer function.

12. The open acoustic device of claim 10, wherein the determining, based on the first secondary route transfer function, the overall secondary route transfer function includes:

determining, based on the first secondary route transfer function, a second secondary route transfer function between the second microphone array and the ear canal of the user; and determining, based on the first secondary route transfer function and the second secondary route transfer function, the overall secondary route transfer function.

13. The open acoustic device of claim 12, wherein the determining, based on the first secondary route transfer function, a second secondary route transfer function includes:

obtaining the first secondary route transfer function; and determining, based on the first secondary route transfer function, the second secondary route transfer function through a trained machine learning model or a preset model.

14. The open acoustic device of claim 13, wherein the machine learning model includes a Gaussian mixture model or a deep neural network model.

15. A method for noise reduction, comprising: determining, based on environmental noise acquired by a first microphone array, a primary route transfer function between the first microphone array and an ear canal of the user; generating, based on the environmental noise and the primary route transfer function, a noise reduction signal; and causing a speaker to output, according to the noise reduction signal, a noise reduction acoustic wave, the noise reduction acoustic wave being configured to eliminate noise signal at the ear canal of the user, wherein determining, based on environmental noise acquired by a first microphone array, a primary route transfer function between the first microphone array and an ear canal of the user comprising: estimating, based on the environmental noise, a direction of a noise source; and determining the primary route transfer function according to the environmental noise, the direction of the noise source, and position information of the first microphone array and the ear canal of the user, wherein the speaker includes two sound guiding holes, and the first microphone array is located near a mid-perpendicular line of a connecting line between the two sound guiding holes so that the microphones is in a region where a sound pressure level of the speaker is minimum.

16. The method for noise reduction of claim 15, wherein the position information of the first microphone array and the ear canal of the user includes a distance between the first microphone array and the ear canal of the user, and the determining the primary route transfer function according to the environmental noise, the direction of the noise source, and the position information of the first microphone array and the ear canal of the user includes: determining the primary route transfer function based on a frequency of the environmental noise, the direction of the noise source, and the distance between the first microphone array and the ear canal of the user.

* * * * *